United States Patent
Zhu et al.

(10) Patent No.: US 9,749,878 B2
(45) Date of Patent: Aug. 29, 2017

(54) SYSTEM AND METHOD FOR MANAGING COMMUNICATIONS FOR TWO NETWORKS IN A COMMUNICATION DEVICE

(71) Applicant: Blackberry Limited, Waterloo (CA)

(72) Inventors: Lizhong Zhu, Waterloo (CA); Fei He, Kitchener (CA); Yan Wu, Waterloo (CA); Qingmai Zhou, Waterloo (CA); Jun Xu, Scarborough (CA); Michael Peter Montemurro, Toronto (CA); Zongyou Zhang, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 473 days.

(21) Appl. No.: 13/955,442

(22) Filed: Jul. 31, 2013

(65) Prior Publication Data

US 2015/0036514 A1    Feb. 5, 2015

(51) Int. Cl.
| | |
|---|---|
| *H04W 24/02* | (2009.01) |
| *H04W 52/18* | (2009.01) |
| *H04W 52/24* | (2009.01) |
| *H04W 52/36* | (2009.01) |
| *H04W 52/28* | (2009.01) |
| *H04W 72/12* | (2009.01) |
| *H04W 88/06* | (2009.01) |
| *H04W 52/38* | (2009.01) |

(52) U.S. Cl.
CPC ........... *H04W 24/02* (2013.01); *H04W 52/18* (2013.01); *H04W 52/244* (2013.01); *H04W 52/367* (2013.01); *H04W 52/38* (2013.01); *H04W 72/1215* (2013.01); *H04W 88/06* (2013.01)

(58) Field of Classification Search
CPC ................. H04W 24/02; H04W 52/18; H04W 52/24–52/241; H04W 52/245; H04B 1/005; H04B 1/0064–1/0078; H04B 1/1027; H04B 2001/1045–2001/1072; H04B 7/08
See application file for complete search history.

(56) References Cited

U.S. PATENT DOCUMENTS

| | | | |
|---|---|---|---|
| 2007/0047625 A1* | 3/2007 | Klomsdorf ........... | H04B 1/1027 375/141 |
| 2011/0117973 A1* | 5/2011 | Asrani et al. ................. | 455/571 |
| 2012/0069766 A1* | 3/2012 | Fu et al. ........................ | 370/252 |
| 2012/0315894 A1* | 12/2012 | Dussmann ......... | H04B 7/15528 455/424 |
| 2014/0112279 A1* | 4/2014 | Yoshizawa .................... | 370/329 |

FOREIGN PATENT DOCUMENTS

| | | |
|---|---|---|
| WO | WO 2012/096949 A1 | 7/2012 |
| WO | WO 2012/119081 A1 | 9/2012 |
| WO | WO 2013/085256 A1 | 6/2013 |

* cited by examiner

*Primary Examiner* — Michael Thier
*Assistant Examiner* — Eric Myers
(74) *Attorney, Agent, or Firm* — Perry + Currier Inc.

(57) ABSTRACT

A system, method and device for adjusting communication parameters for networks communicating with a communication device are provided. The method comprises: when the communication device is linked to a first communication network and a second communication network, comparing a strength of received signals from the second network against a threshold; and when the strength of the received signals is less than the threshold, adjusting a network parameter of signals received from the second communication network by the communication device.

20 Claims, 8 Drawing Sheets

SYSTEM AND METHOD FOR MANAGING COMMUNICATIONS FOR TWO NETWORKS IN A COMMUNICATION DEVICE

FIELD OF DISCLOSURE

The disclosure describes generally a system and method for managing communications for two (or more) networks in a communication device. In particular, the disclosure relates to adjusting timing of monitoring for communications received from one network when there is interference with another network.

BACKGROUND OF DISCLOSURE

Wireless mobile communication devices perform a variety of functions to enable mobile users to stay organized and in contact with others in a communication network through e-mail, schedulers and address books. Wireless devices are designed to enter and leave different wireless networks.

A communication device may have multiple simultaneous connections to multiple networks. Transmissions and communications to multiple networks simultaneously require management of all aspects of communications for both networks. Operating regulations for one communication network may affect how communications for another network are provided. There is a need to enhance operating parameters for one or both networks for the communication device in such environments.

BRIEF DESCRIPTION OF THE DRAWINGS

Embodiments of the disclosure will now be described, by way of example only, with reference to the accompanying drawings, in which.

DESCRIPTION OF EMBODIMENTS

Figure 1:
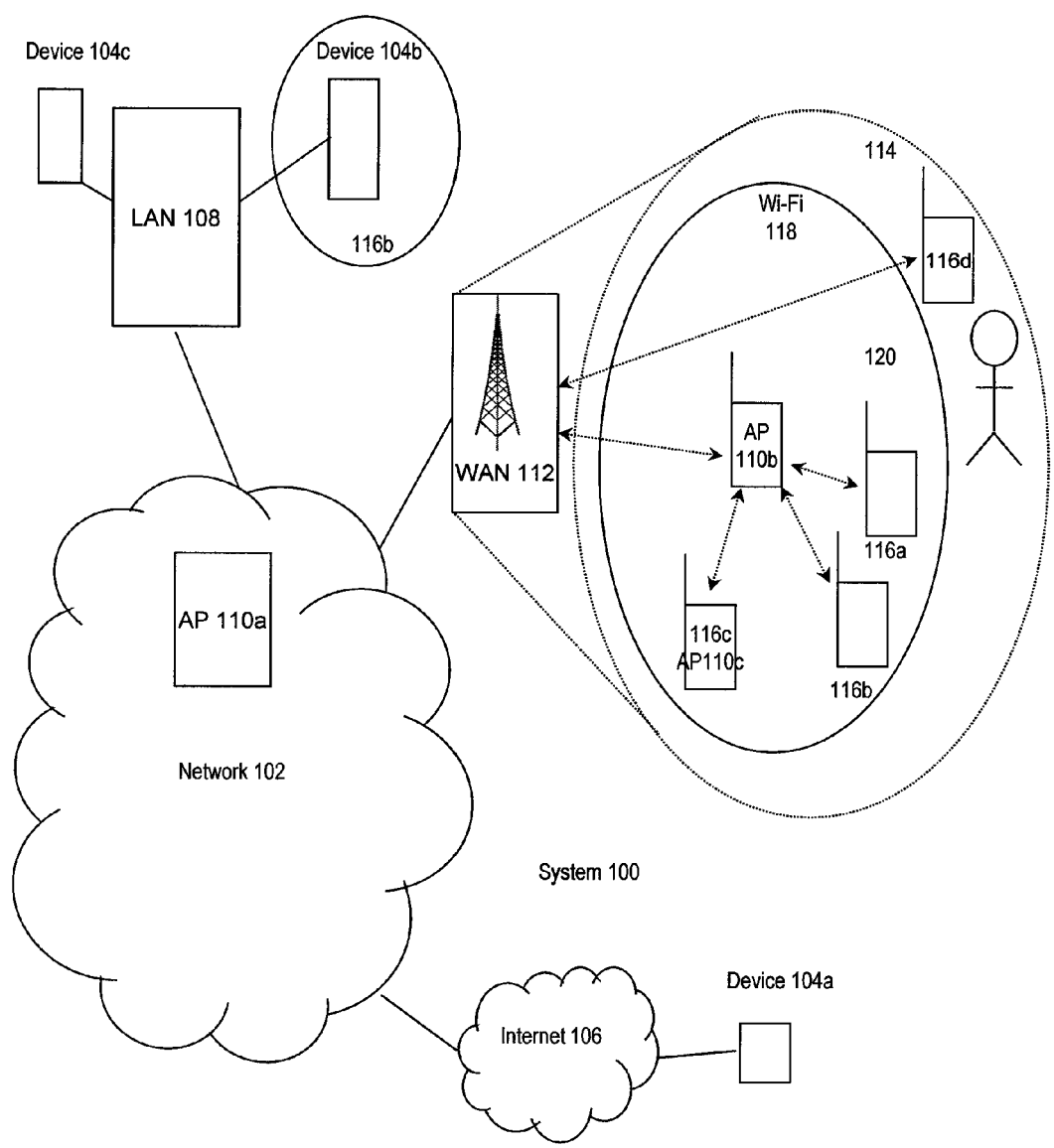
FIG. 1 is a schematic diagram of a communication system including a wireless cellular communication network and a wireless local area network (WLAN) as two communication networks that are both communicating with a communication device according to an embodiment.

Exemplary details of embodiments are provided herein. The description that follows and the embodiments described therein are provided by way of illustration of an example or examples of particular embodiments of principles of the present disclosure. These examples are provided for the purposes of explanation and not limitation of those principles and of the disclosure. In the description that follows like parts are marked throughout the specification and the drawings with the same respective reference numerals.

Briefly, an embodiment provides systems, methods, processes and devices for detecting or monitoring current and new connection(s) to networks by a communication device. Depending on the status of the connections, an embodiment can initiate adjustments for communication parameters that the communication device implements to communicate with one of the networks. In particular, an embodiment may operate when the communication device is currently communicating with two (or more) networks. One embodiment processes communications from first and second networks for a communication device. When the communication device is processing simultaneous or near-simultaneous communications from the first and second networks, depending on one or more characteristics of one or both of the networks, an embodiment may adjust a communication parameter that the device is using for one of the networks. For example, an embodiment can monitor/detect communication parameters of the second network and when it is determined that the parameters cause an interference with communications processed for the first network, an embodiment may change the timing of monitoring for communications from the second network to not interfere with a timing of transmissions to the first network (or vice versa). A further adjustment may be made to decrease power of transmissions sent by the device to first or second communication network. The adjustment may be made in order to comply with regulations associated with the first or second networks. Generally, an adjustment may be made to communications with one network depending on detected characteristics of a second network (or vice versa).

In a first aspect, a method of adjusting communication parameters for networks communicating with a communication device is provided. The method comprises: when the communication device is linked to a first communication network and a second communication network, comparing a strength of received signals from the second network against a threshold; and when the strength of the received signals is less than the threshold, adjusting a network parameter of signals received from the second communication network by the communication device.

When the communication device is linked to the first communication network and the second communication network, the method may further comprise when the strength of the received signals is greater than the threshold, not adjusting the network parameter of the signals received from the second communication network and not adjusting transmission parameters of signals transmitted to the first communication network.

In the method, the first network may be a cellular network; and the second network may either be a WLAN communication network or utilize an industrial, scientific and medical (ISM) communication band.

In the method, the network parameter may adjust times when the received signals are monitored, utilizing a first time slot for processing communications for the first network and a second time slot for monitoring for the received signals, the second time slot not overlapping with the first time slot.

In the method, during the first time slot, the communication device may not monitor for the received signals.

In the method, the threshold may comprise a required sensitivity level for signals at a data rate received from the second network at the communication device, a de-sense value of signals received from the second network due to interference of the first network and a factor incorporating operating conditions of the communication device.

In the method, the required sensitivity level for signals may incorporate sensitivity data for a class of communication devices.

In the method, the de-sense value may indicate a received signal sensitivity level for signals received from the second communication network.

In the method, when the communication device is linked to the first communication network and the second communication network and when the strength of the received signals is not greater than the threshold, the method may further comprise adjusting a network parameter of signals received from the second communication network by the communication device.

In the method, the network parameter may adjust times when the received signals are monitored, utilizing a first time slot for processing communications for the first network and a second time slot for monitoring for the received signals, the second time slot not overlapping with the first time slot.

In the method, during the first time slot, the communication device may not monitor for the received signals.

In the method, when the communication device is linked to the first communication network and the second communication network and when the strength of the received signals is greater than the threshold, the method may further comprise lowering a transmission power of signals sent to the second communication network.

In the method, the transmission power of signals sent to the second communication network may be lowered by a factor accounting to specific absorption rate (SAR) limits.

In a second aspect, a system for adjusting communication parameters for networks communicating with a communication device is provided. The system comprises: a processor; a memory module for storing instructions for execution on the processor; and a monitoring module. The monitoring module provides instructions for execution on the processor to: monitor for when the communication device is linked to a first communication network and a second communication network and then compare a strength of received signals from the second network against a threshold; and when the strength of the received signals is less than the threshold, initiate an adjustment of a network parameter of signals received from the second communication network by the communication device.

In the system, when the strength of the received signals is greater than the threshold the monitoring module may provide further instructions to the processor to not adjust the network parameter of the signals received from the second communication network and not adjusting transmission parameters of signals transmitted to the first communication network.

In the system the network parameter may adjust times when the received signals are monitored, utilizing a first time slot for processing communications for the first network and a second time slot for monitoring for the received signals, the second time slot not overlapping with the first time slot.

In the system during the first time slot, the communication device may not monitor for the received signals.

In the system the first network may be a cellular network; and the second network may be a WLAN communication network.

In the system, the threshold may comprise a required sensitivity level for signals at a data rate received from the second network at the communication device, a de-sense value of signals received from the second network due to interference of the first network and a factor incorporating operating conditions of the communication device.

In other aspects, various combinations of sets and subsets of the above aspects are provided.

Before discussing details on specific features of an embodiment, a description is provided on a system where a communication device according to an embodiment is capable with establishing, monitoring and configuring communication parameters with one or more networks in the system. Then, details are provided on an exemplary device in which an embodiment operates.

Referring to FIG. 1, details of a system of exemplary networks and communication devices according to an embodiment are provided. FIG. 1 shows communication system 100 where network 102 provides access to a suite of applications, services and data to its connected devices 104 (and other devices) through its associated servers. Network 102 may be implemented in any known architecture, providing wired and/or wireless connections to its elements. It will be appreciated that in other embodiments, various networks and sub-networks as described herein may be incorporated into other networks.

Internet 106 may be connected to network 102 providing a connection for device 104a to network 102. Local area network (LAN) 108 is connected to network 102 and provides local wired and wireless connections to its devices 104b and 104c. Access point (AP) 110a provides a connection within network 102 to LAN 108.

An exemplary wireless network provides wireless communication coverage to devices that are located within the wireless transmission area of the Wide Area Network (WAN). In FIG. 1, one exemplary wireless network is a WAN 112 having a transmission area defined schematically by circle 114. Devices 116 may have wireless communication capabilities with one or more different wireless networks. WAN 112 may have multiple transmission areas by having multiple communication towers.

A WAN network may be provided by a cellular communications company, such as Verizon (trade-mark). WAN 112 may be referred to herein as cellular network 112. Wireless devices 116a-d communicate through a data link layer in cellular network 112. In an exemplary environment, cellular network 112 is a local, geographically small, wireless network. Wireless devices 116 include handheld devices, cell phones and computers (either desktop or portable) having a (wireless) network card, network adapter and/or network interface controller ("NIC") installed therein.

Devices 116*a-d* and AP 110*a* may move within network 112 and its area 114. As such, connection characteristics of signals received by devices 116*a-d* from network 112 may dynamically change, with the quality of the connections provided for an area ranging among non-existent, poor, adequate, good and excellent (with values in-between). Several characteristics of the connection may determine its quality, such as the strength of the RF signal in the connection, error correction procedures conducted for the connection, redundant transmissions made for communications over the connection, and others. Additionally, use of the current connection and its frequencies may be subject to restrictions for a device in network 112, such as device 116*a*.

In system 100, network 118 in one embodiment is a Wi-Fi network that provides an overlapping network for devices 116*a-c* and AP 110*b* simultaneously with network 112. Further details of a Wi-Fi network are provided below.

First, operating parameters for exemplary network 118 follow standards set by the IEEE LAN/MAN Standards Committee, known as IEEE 802, through its working group "11". The IEEE 802.11 standard defines media access control (MAC) and physical (PHY) layers in the OSI protocol model for a wireless local area network (WLAN). A Wi-Fi network is one type of WLAN. Currently, the family of IEEE 802.11 amendments encompass six wireless modulation techniques that all use the same communication protocol among their communicating elements. Other modulation techniques may be used. Current versions of IEEE 802.11 networks include: IEEE 802.11a, b, g, y, ac, ad, ah and af, representing PHY amendments to IEEE 802.11. The IEEE 802.11 working group defines numerous distinct frequency ranges for transmission frequencies, e.g. so-called "white spaces" of the VHF/UHF television transmission bands (namely frequencies that are unused or underutilized geographically or temporally as specified in a geo-location database or its proxy server), 900 MHz, 2.4 GHz, 3.6 GHz, 4.9 GHz, 5.0-6.0 GHz, 60 GHz bands and other bands. Each frequency range may be divided into sets of channels. Communications can be specified to be carried on a particular channel for a particular band. Specific transmission details and parameters of these networks and channels are known to those of skill in the art. Network 118 may be referred to herein as WLAN 118.

For an IEEE 802.11 network, a station ("STA") is a basic component in the network. A station is any device that implements the functionality of an IEEE 802.11 protocol. It may (or may not) have a connection to a WLAN infrastructure. By convention generally, a station is an integral part of a WLAN. A station may be any device, including a laptop computer, device 104, wireless device 116 or AP 110. By convention, the term station is used for a mobile device and a station is understood to support the IEEE 802.11 station services of authentication, de-authentication, privacy and data delivery.

Network 118 has AP 110*b*, which supports radio transmission equipment known to those skilled in the art. AP 110*b* is a communication device that contains an IEEE 802.11 radio receiver/transmitter (or transceiver) and functions as a bridge between network 112 and other networks (such as network 102, Internet 106 and/or LAN 108) for its carried communications. As such, AP 110*b* establishes a Wi-Fi network which happens to be operating within WAN 112.

Wi-Fi network 118 has a transmission area denoted by circle 120 and covers devices 116*a-c*. Device 116*d* is shown as being inside network 118 and its transmission area 114, but outside the transmission area 120 for the Wi-Fi network surrounding AP 110*b*. Bi-directional arrows connecting AP 110*b* to devices 116*a-c* show individual connections established for those devices to AP 110*b*. AP 110*b* provides data distribution services among devices 110/116 within area 120 under network 118 simultaneously with communications provided by network 112. AP 110*b* may be a wireless device and as such AP 110*b* is effectively another wireless device 116.

An IEEE 802.11 network may be implemented in one of many network modes. An "ad hoc" IEEE 802.11 mode allows devices to operate in an independent basic service set (IBSS) network configuration. With an IBSS, there are no access points. Clients in a network communicate directly with each other in a peer-to-peer manner. One ad hoc network follows the Wi-Fi Alliance's Peer-to-Peer (P2P) Technical Specification, as defined by the Wi-Fi Alliance Technical Committee P2P Task Group. In an exemplary P2P group, a set of P2P devices communicate with each other. A P2P device has several characteristics. For example, it may: function as a P2P group owner ("GO") as an administrator and/or as a P2P client; conduct negotiations to assume a P2P GO role or P2P client role; provide network configuration (such as Wi-Fi Simple Configuration or WSC) and network discovery operations; and support WLAN and P2P concurrent operations. A P2P GO may provide: "AP-like" roles of BSS functionality and services for associated clients in the network (for example P2P clients or legacy clients); network configuration registrar functionality; communication with associated clients; and access to a simultaneous WLAN connection for its associated clients. In another configuration, network 118 may be an "ad-hoc" network.

"Hotspot" functionalities for AP 110*b* may be provided in devices 116. For example, device 116*c* may have capabilities to be another Wi-Fi hotspot host and operate as AP 110*c*. As AP 110*b* is the data distribution point for its Wi-Fi network, it will be seen that the transmission area is focussed around AP 110*b*.

In an IEEE 802.11-class network, messages are sent between its AP 110 and its communicating devices 116 in data transmissions called frames. Most frames are sent and processed in a "send-and-respond" protocol. Additional materials relating to frames are provided in published IEEE 802.11 Working Group materials.

A beacon frame is a type of a management frame that is periodically broadcast by an AP 110 to provide a signal of its presence to the communication boundaries of its network. The typical period of transmission of a beacon frame is about every 100 ms. The current IEEE 802.11 standards set the period to be 102.4 ms. A beacon frame is used as a synchronizing signal for transmitting broadcast and multicast traffic to devices in the associated network. Immediately following the beacon frame, if broadcast or multicast traffic is queued to be provided, such traffic is transmitted by AP 110 through its network 118. For device 116*a* to maintain/establish communications with AP 110*b* (and its related network 118), device 116*a* may need to receive and respond to a beacon frame sent from AP 110*b*. Under Wi-Fi constructs, device 116*a* can initiate an active scan or a passive scan to scan for beacon frames.

Figure 2:
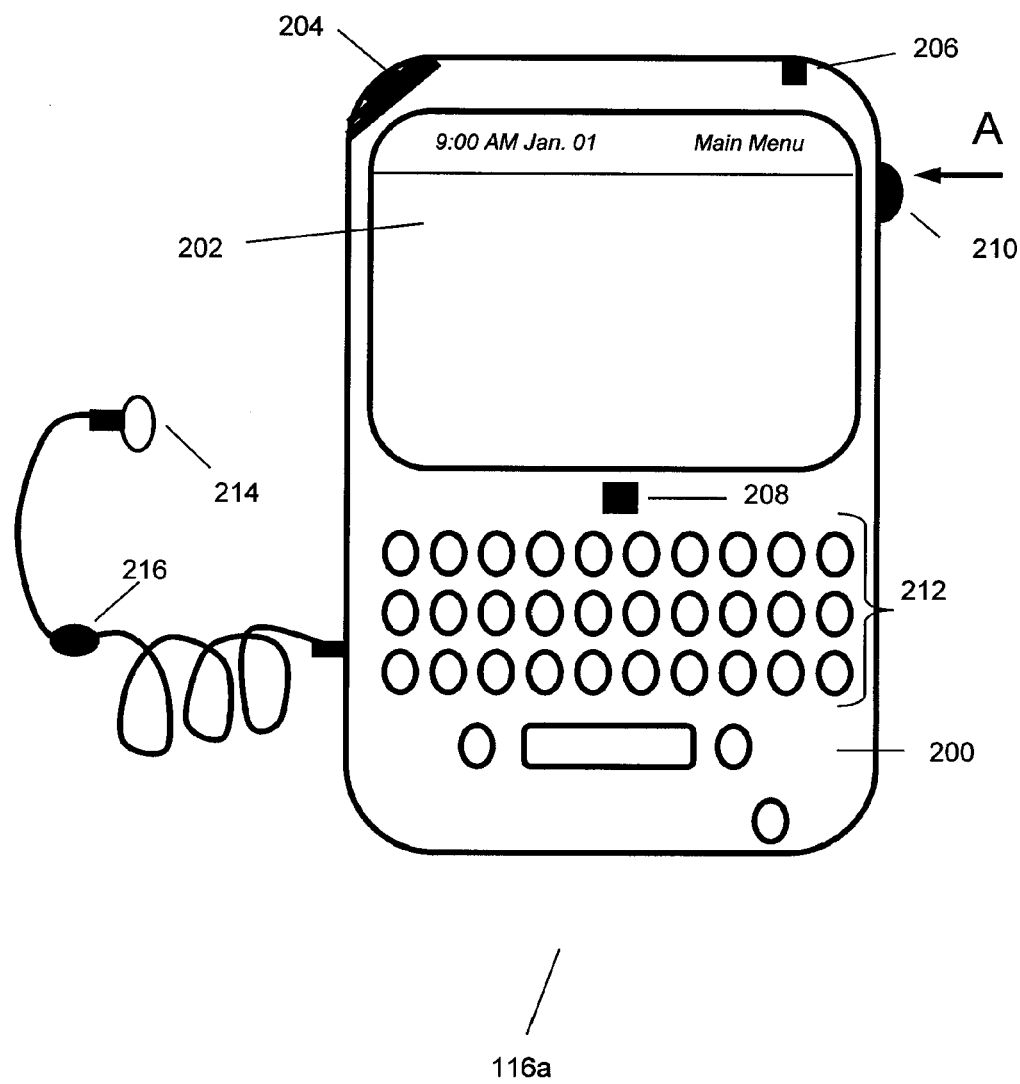
FIG. 2 is a schematic representation of the communication device of FIG. 1 according to an embodiment.

Now, details are provided on an exemplary device according to an embodiment. FIG. 2 shows general features of device 116*a* in accordance with an embodiment of the disclosure. These features may also be present in AP 110*b* and devices 104. An embodiment may be implemented in different network environments, where two or more different networks are detected. For example, a first network may be a cellular network, such as an LTE network. A second network may be a WLAN, of any implementation. A WLAN may be operating in a GO mode. Features of an embodiment may be incorporated into a femtocell device (i.e. a fixed dual-mode device) with a cellular data backhaul.

In the present embodiment, device 116a is based on a computing platform having functionality of an enhanced personal digital assistant with cellphone and e-mail features. Device 116a is a processor-controlled device (not shown). Software applications, modules and firmware operating on device 116a control its operations and network connections to implement the above-noted features. Further detail on selected applications for an embodiment is provided later. It is understood that device 116a may be based on construction design and functionality of other electronic devices, such as smart telephones, desktop computers, pagers or laptops having telephony equipment. In a present embodiment, device 116a includes a housing 200, an LCD 202, speaker 204, an LED indicator 206, an input device 208 (which may be a trackpad, trackball, thumbwheel or other input device), an ESC ("escape") key 210, keypad 212, a telephone headset comprised of an ear bud 214 and a microphone 216. Ear bud 214 may be used to listen to phone calls and other sound messages and microphone 216 may be used to speak into and input sound messages to device 116a. ESC key 210 may be inwardly depressed along the path of arrow "A" as a means to provide additional input to device 116a. It will be understood that housing 200 may be made from any suitable material as will occur to those of skill in the art and may be suitably formed to house and hold all components of device 116a.

Device 116a is operable to conduct wireless telephone calls, using any wireless phone system. Exemplary technologies are any known wireless phone systems such as a Mobitex (trade-mark) network, a DataTAC (trade-mark) network, a General Packet Radio Service (GPRS) network and also a variety of data and voice communication networks, such as Advanced Mobile Phone Service (AMPS), Time Division Multiple Access (TDMA), Code Division Multiple Access (CDMA) system, wireless CDMA, CDMA 2000 system, Cellular Digital Packet Data (CDPD) system, Personal Communication Service (PCS), Global System for Mobile Communication (GSM), Wi-Fi networks, 3GPP Long Term Evolution (LTE) networks, LTE time division duplex (LTE TDD) networks etc. Cellular networks for a given technology may operate in one or more bands and may have one or more channels for a particular band. For example, GSM networks may operate in one of three bands (900/1800/1900 MHz or 850/1800/1900 MHz) or in one of four bands (850/900/1800/1900 MHz). For a particular cellular network, device 116a may be operable to communicate in one or more bands. A band may be divided into a set of channels, where each channel occupies a particular subset of the spectrum of the band. For a LTE network, its standard supports packet switching in an IP network. As voice calls in GSM, UMTS and CDMA 2000 are circuit switched, three different implementations have been developed to support voice calls in an LTE network:

VoLTE (Voice Over LTE), which is based on a IP Multimedia Sub-system (IMS) network;
CSFB (Circuit Switched Fallback), where device 116a initially provides only data services and when a voice call is to be initiated or received, device 116a reverts to a circuit switched network; and
SVLTE (Simultaneous Voice and LTE), where device 116a operates simultaneously in LTE and circuit switched (CS) modes.

Other wireless communication systems that device 116a may support may include Wireless WAN (IMS), Wireless MAN (Wi-Max or IEEE 802.16), Wireless LAN (IEEE 802.11), Wireless PAN (IEEE 802.15, Zigbee and Bluetooth), high-speed data packet access (HSDPA) networks, Evolved High Speed Packet Access (HSPA+) networks, etc. and any others that support voice and data. Additionally, a Bluetooth network may be supported. Other embodiments include Voice over IP (VoIP) type streaming data communications that may simulate circuit-switched phone calls. Device 116a may have capabilities of communicating with other devices using other communication technologies, including instant messaging (IM) systems, text messaging (TM) systems and short message service (SMS) systems.

Device 116a may operate as a dual-mode (or multi-mode) modem, where links to multiple communication networks can be sustained simultaneously or nearly simultaneously. Its mobile data communication functions allow it to make WAN connections and allow it to deliver voice and e-mails to user of device 116a. Overall throughput between AP 110b and device 116a may depend on an instantaneous wireless signal quality of two PHY layers, namely a Physical Coding Sublayer (PCS) and a Physical Medium Dependent (PMD) layer. The PCS encodes and decodes the data that is transmitted and received. Communications to two (or more) networks may be simultaneously or nearly simultaneously processed by device 116a in parallel and/or by using duplexing signal processing techniques, including time division duplex (TDD) and frequency division duplex (FDD) techniques. In TDD, a series of time slots in a time period are defined and within a given time slot, communications (receive and/or transmit) are dedicated to a particular network for processing by device 116a. In FDD, two separated frequency bands are used to process communications (receive and/or transmit) for two networks by device 116a. The transmissions may be processed simultaneously.

Device 116a may have modules to provide near field communication (NFC), allowing it to communicate wirelessly with another device when the two devices are placed in very close proximity to each other. NFC technologies are an extension of the ISO 14443 proximity-card standard as a contactless card, Radio Frequency Identification (RFID) standard that incorporates the interface of a smart card and a reader into one device. A NFC-enabled device, such as device 116a, typically includes an NFC integrated circuit (IC) that communicates to such devices as existing ISO 14443 smart cards and readers and other NFC devices and compatible with any existing contactless infrastructure. The NFC ICs may magnetic field induction where two loop antennas are located near each other and form an air-core transformer. The NFC technology operates on an unlicensed radio frequency industrial, scientific and medical (ISM) band of about 13.56 MHz and has a bandwidth of about 2 MHz. The working distance for the two devices is usually about between 0 and 20 centimeters. In use, a user of a first NFC device brings it close to another NFC enabled device or tag to initiate NFC communication. NFC data rates range from about 106 to 424 kbit/s.

Now, details are provided on an embodiment that provides processes, methods, devices and systems to analyze characteristics first and second networks that are in communication with a communication device. When the communication device is processing simultaneous or near-simultaneous communications from the first and second networks, coexistence issues may arise with the two networks, such that communications received/transmitted from one network may cause an interference with communications received/ transmitted from the other network. As such, an embodiment monitors one or more characteristics of one or both of the networks and depending on a co-existence analysis, an embodiment may adjust a communication parameter that the device is using for one of the networks. In particular, adjustments to parameters may be made that affect how received and/or sent transmissions are processed (e.g. timing of scans, frequency of scans, change of scan frequencies, etc.). The terms "adjustment" and "adjust" as used herein are provided with a wide scope of meaning. In adjusting a parameter of an operation, the parameter may be increased, decreased or changed in how it controls the operation. For example, adjustments may be provided to: increase or decrease a level of transmission power for transmission signals; change a transmission band used to carry the signals; change a channel parameter; and/or increase or decrease a frequency of the signals sent by the device over the second network. In another embodiment, adjustments may be made to a transmission power for signals sent by the communication device to the second (wireless) communication network.

An embodiment provides systems, methods, algorithms, processes and/or devices to address two exemplary co-existence issues for first and second networks communicating with a communication device. A first co-existence issue is a de-sensing (i.e. a reduction in sensitivity due to presence of interference) of signals received from a second network that are received by a (wireless) receiver in the communication device. The de-sensing may be caused by one or more external factors, such as interference from transmissions being sent to a first network. A second co-existence issue is a de-sensing of signals received from a first network that a receiver of the communication device is processing due to intermodulation interference ("IMI") generated by simultaneous transmissions sent to the first and/or second networks or by out-of-band emissions generated from transmissions sent to the first network.

Examples of co-existence issues and features of embodiments to address same are illustrated with a first exemplary network being a cellular network, such as a LTE network (e.g. WAN 112, FIG. 1) and a second exemplary network being a WLAN (e.g. Wi-Fi network 118, FIG. 1) for a communication device (e.g. device 116a, FIG. 1). For convenience, and not limitation, the following section in the disclosure associates a "first" network as an LTE network and a "second" network as a WLAN. In other embodiments, the associations may be switched or other associations with other types of networks may be made.

Features of an embodiment that address each co-existence issue are discussed in turn.

Table A illustrates exemplary effects on signals received by the communication device from either the WLAN or LTE network. Table A shows for a communication device (such as device 116a, FIG. 1), a matrix of LTE B7 channels for one configuration of the first network (such as WAN 112, FIG. 1) compared against WLAN channels and frequencies for the second network (such as WLAN network 118, FIG. 1). Entries in the matrix show where co-existence issues between the first and second networks may be experienced by the communication device. Table A provides an exemplary mapping of a set of WLAN transmission frequencies against a set transmission (Tx) and reception (Rx) frequencies for a LTE network used by device 116a and an indication of where there is an issue with IMS and other overlaps between the networks. Where there is an issue a change in a parameter of one or more transmission/reception parameters in one or both of the networks may be implemented by an embodiment. An empty cell indicates that no change in a parameter is warranted for either network. For example when device 116a is processing WLAN transmissions to network 118 at 2772 MHz, for the present LTE network 112, no change has been deemed to be required. Table A also shows two exemplary techniques to address the co-existence issues. Each is discussed in turn.

The first technique is a power back-off of transmissions. A cell containing the label "back-off" indicates that a power back-off for the WLAN transmissions should be implemented. For example, when device 116a is processing WLAN transmissions to network 118 at 2417 MHz, for a LTE network 112, a WLAN back-off can be implemented when LTE transmissions are carried over the 2520 MHz, 2530 MHz, 2540 MHz and 2550 MHz bands, but not over the 2560 MHz band. Table A also shows overlaps between WLAN and LTE receptions.

The second technique recognizes that there is a de-sensing of received signals at a receiver at a communication device. Depending on the level of de-sense (i.e. depending on a threshold for a maximum acceptable loss), the loss may simply be tolerated with no action taken. For example, where an entry in Table A has a "WLAN Rx" entry, then for the corresponding pair of WLAN transmissions/receptions (at its noted frequency) and the corresponding communications received at the noted LTE frequency, there is co-existence interference. In this overlap situation, WLAN Rx signals may be sacrificed, i.e. the sensitivity for the received signals may be reduced. Other combinations of other networks may have different back-off/de-sensitizing characteristics for transmitted and/or received signals for one and/or both networks. Where an entry in Table A has a "LTE Rx" entry, there is a WLAN/LTE overlap and LTE Rx signals may be sacrificed, i.e. at a receiver its sensitivity may be reduced. Other tables may have different entries at different frequencies. Other combinations of other networks may have different back-off/de-sensitizing characteristics for transmitted and/or received signals for one and/or both networks.

TABLE A

| | | LTE Tx Frequency (MHz) | | | | | |
|---|---|---|---|---|---|---|---|
| WLAN Chan. | WLAN Freq. MHz | 2510 | 2520 | 2530 | 2540 | 2550 | 2560 |
| | | LTE Rx Frequency (MHz) | | | | | |
| | | 2630 | 2640 | 2650 | 2660 | 2670 | 2680 |
| 13 | 2472 | WLAN Rx | WLAN Rx | | | | |
| 12 | 2467 | WLAN Rx | WLAN Rx | | | | |
| 11 | 2462 | WLAN Rx | WLAN Rx | | | | |
| 10 | 2457 | WLAN Rx | WLAN Rx | | | | |
| 9 | 2452 | | | | | | Back-off |

TABLE A-continued

| | | LTE Tx Frequency (MHz) | | | | | |
|---|---|---|---|---|---|---|---|
| WLAN | WLAN Freq. | 2510 | 2520 | 2530 | 2540 | 2550 | 2560 |
| | | LTE Rx Frequency (MHz) | | | | | |
| Chan. | MHz | 2630 | 2640 | 2650 | 2660 | 2670 | 2680 |
| 8 | 2447 | | | | | | Back-off |
| 7 | 2442 | | | | | Back-off | Back-off |
| 6 | 2437 | | | | | Back-off | Back-off |
| 5 | 2432 | | | | Back-off | Back-off | Back-off |
| 4 | 2427 | | | | Back-off | Back-off | Back-off |
| 3 | 2422 | | | Back-off | Back-off | Back-off | Back-off |
| 2 | 2417 | | | Back-off | Back-off | Back-off | Back-off |
| 1 | 2412 | | Back-off | Back-off | Back-off | Back-off | LTE Rx |

Also, application of a Time Domain Multiplexing (TDM) scheme for allocating time slots for processing communications (transmit or receive) for one network in exclusion of processing signals (transmit or receive) for other networks may be used to reduce co-existence interference for communications handled for the first and second networks. In one TDM scheme, communications for the communication device are processed in a series of repeating time slots, where each time slot is allocated to one communication network and during that time slot in a repeating cycle, the communication device transmits and/or received communications solely from the network associated with that cycle. In order to minimize a relating penalty on data throughput, an embodiment evaluates additional parameters to determine when a preferred situation exists to activate TDM processing of signals for the first and second networks.

As a further example, Table B shows co-existence scenarios for the LTE band 7/band 40/band 41 network (B7/B40/B41) as the first network and WLAN 2.4 GHz as the second network. In Table B entries are marked with both LTE Rx and WLAN Rx ("LTE/WLAN Rx" or "L/W Rx") because one or both receivers may be de-sensed by the other transmitter.

inhibit WLAN transmissions during a time when LTE B7/B40/B41 signals are received from the LTE network.

An embodiment utilizes information on the operating states of networks detected by a communication device with additional information to identify a state when the communication device may implement a different network processing scheme (e.g. TDM) for processing communications for the detected networks in order to reduce de-sensing of signals and to attempt to minimize a data throughput penalty for communications for one or more of the networks.

Initially, an embodiment utilizes network co-existence information for an exemplary LTE network (as a first network) and a WLAN (as a second network) detected by a communication device, including: co-existence operation states; and LTE operation frequency. An embodiment addresses radio-to-radio coexistence issues, where WAN 112 and WLAN 118 communications are being processed simultaneously or nearly simultaneously by device 116a. For example, for LTE transmissions that are provided at a particular frequency (such as in B7) and/or have been allocated a higher number of resource blocks (thereby increasing the bit rate for transmissions), these LTE transmissions may de-sense (i.e. lower the sensitivity) of received

TABLE B

| WLAN | WLAN Freq. | LTE Rx Frequency (MHz) | | | | | | | | |
|---|---|---|---|---|---|---|---|---|---|---|
| Chan. | MHz | 2310 | '20 | '30 | 2340 | 2350 | 2360 | 2370 | 2380 | 2390 |
| 1 | 2412 | | | | LTE/WLAN Rx | L/W Rx | L/W Rx | L/W Rx | L/W Rx | L/W Rx |
| 2 | 2417 | | | | | L/W Rx | L/W Rx | L/W Rx | L/W Rx | L/W Rx |
| 3 | 2422 | | | | | L/W Rx | L/W Rx | L/W Rx | L/W Rx | L/W Rx |
| 4 | 2427 | | | | | | L/W Rx | L/W Rx | L/W Rx | L/W Rx |
| 5 | 2432 | | | | | | L/W Rx | L/W Rx | L/W Rx | L/W Rx |
| 6 | 2437 | | | | | | | L/W Rx | L/W Rx | L/W Rx |
| 7 | 2442 | | | | | | | L/W Rx | L/W Rx | L/W Rx |
| 8 | 2447 | | | | | | | | L/W Rx | L/W Rx |
| 9 | 2452 | | | | | | | | L/W Rx | L/W Rx |
| 10 | 2457 | | | | | | | | | L/W Rx |
| 11 | 2462 | | | | | | | | | L/W Rx |
| 12 | 2467 | | | | | | | | | |
| 13 | 2472 | | | | | | | | | |

For a LTE B7/B40/B41 network and a WLAN 2.4 GHz network, a TDM scheme may also be used to reduce de-sensing of received signals from one or more networks. Again, an embodiment provides features and tests to identify network situations where it is beneficial to either reduce WLAN transmission (Tx) power to reduce LTE Band 7 (B7) received (Rx) signal de-sense and/or to use a TDM mode to signals on a 2.4 GHz WLAN/Bluetooth transmissions at device 116a. A higher (negative) value for sensitivity (expressed typically as "–dBm") is a more sensitive value. Also, LTE signals received at device 116a may lose sensitivity in due in part to intermodulation of signals from one or both the WLAN and WAN transmissions into the LTE reception band. These two exemplary situations described for LTE and WLAN networks may be produced when signals from two or more other networks interact with each other.

To address such co-existence issues, an embodiment provides features that may be implemented separately or together in various combinations. These features (alone or together in any combination) may also be combined with other signal adjustments described above.

A first feature is to apply filtering to one or both of communication signals (either transmitted or received signals) to one or both of the networks 112 and 118 at device 116a or elsewhere. Filtering may be provided in the frequency domain (e.g. a filter stage in a circuit at or near an antenna), the digital domain (e.g. a digital filter module that attenuates or removes digitally part of a signal) or both. Multiple filtering stages may be provided. One filtering stage addresses leakage between channels of the two networks, such as adjacent channel leakage from transmission signals from an LTE transmission into a WLAN received channel. For example, a filter may be provided at an output stage of transmission signals from device 116a for signals sent to network 112, which may be over LTE B7 transmissions. Additionally or alternatively, a band pass filter may be provided at the WLAN transmit/receive antenna designed to block/reduce LTE transmission signals received at the WLAN antenna. As such the band pass filter provides an out-of-band (for WLAN signals) block for the WLAN receiver.

A second feature provides a communication algorithm that attempts to reduce collisions between transmissions generated by device 116a for between networks 112 and 118. Specifically, modules may be provided to regulate timings of transmissions from device 116a for one or both of transmissions being sent to networks 112 and 118 such that a transmission for one network is not sent and/or monitoring for received signals from the network is not conducted when a transmission (and/or a reception) of a communication from another network is expected by device 116a. For example, device 116a may avoid sending a transmission over network 112 when device 116a is receiving communications from network 118. This feature can be implemented via a hardware/software interface that bridges WLAN and cellular communications to monitor the communication status of both networks for device 116a and to make appropriate adjustments to the timing of transmissions for network 112 by device 116a to avoid such collisions. This can be accomplished, for example, by selecting time slot(s) for network 112 transmissions that do not overlap with receiving time slot(s) for network 118 receptions or by selecting transmission frequencies for network 112 transmissions that do not overlap with frequencies for network 118 receptions.

A third feature selectively reduces output power of transmissions sent to network 118 by device 116a. It has been observed that when simultaneous WLAN and LTE transmissions from device 116a were made, a loss in sensitivity was experienced that was due to intermodulation (active and/or passive) of both WLAN and LTE B7 transmissions. This may be due, at least in part, to interactions with metal antennae in device 116a for the two networks, limited isolation of WLAN transmission signals between LTE antenna and radio frequency power amplifier of device 116a and other factors. As such, third order intermodulation signals may be generated that fall into the LTE B7 receiving band, where their magnitudes may vary significantly. Sensitivities among different devices 116 in network 112 may vary dramatically among devices. The third feature has been found, in part, through experimental data to be effective in reducing intermodulation signals while not avoiding vulnerabilities of varying sensitivities among devices.

A threshold may be used and evaluated to determine when a back-off is provided and to identify an amount of back-off. For example, in one embodiment, if the current level of degradation of throughput for transmissions to network 112 from device 116a is below (or above) a predetermined threshold, then a back-off may be implemented (or not). For example, a degradation threshold (e.g. less than approximately 5-20% degradation) may be set that compares a downlink throughput to network 112 to throughput when there are no transmissions to WLAN 118 (or the connection to WLAN 118 is off). If the degradation is below the threshold, then no back-off is implemented. If the degradation is above the threshold, then a scaled back-off may be implemented.

The WLAN back-off may be enabled only if certain conditions are detected by device 116a for network 112 and/or network 118. For example, if device 116a is currently in a Mobile Hot Spot (MHS) mode for WLAN 118, then the back-off may not be implemented. This is because in the MHS mode, the WLAN radio may select a channel and the selected channel may not cause a received LTE communications to lose sensitivity.

The WLAN back-off may be enabled only if certain other conditions are detected by device 116a. For example, if device 116a is currently near an AP, device 116a may be able to perform an alternative back-off regime. For example, a back-off may be implemented based on WLAN received transmission received signal strength indicator (RSSI), which indicates a distance between device 116a and the AP, so that when the distance exceeds a threshold, a back-off is not provided.

The amount of WLAN back-off (in dB) may be set depending on current operating conditions of device 116a for transmissions to networks 112 and/or 118. For example, depending on current transmit and receive frequency bands for network 112 communications (for an LTE network), different back-off parameters may be set for transmissions over network 118. For example, a WLAN power back-off that may affect LTE received signals may be implemented under certain conditions, such as only during simultaneous transmission of WLAN and LTE B7. In that situation a third order intermodulation distortion of WLAN transmissions at one frequency and LTE transmissions at another frequency may cause a decrease in sensitivity of LTE B7 received signals (e.g. between 2620 and 2690 MHz). Additionally or alternatively, the amount of back-off for a LTE receive de-sense may also be set based on expected "best"/"preferred" uplink and downlink throughput(s) of device 116a during simultaneous LTE B7 and WLAN operations conducted by device 116a.

The amount of a WLAN back-off (in dB) may be provided as an additional back-off to an existing adjustment (e.g. as an arithmetic sum of an existing adjustment). For example, if a back-off is already provided for a SAR adjustment (as noted earlier), then an additional back-off may be provided for WLAN transmissions during simultaneous transmissions to networks 112 (LTE B7) and 118 (WLAN) if the current amount of back-off does not meet an optimal coexistence system throughput, as described above.

The amount of WLAN back-off (in dB) may vary from device 116a to other devices, as the third order inter-modulation may vary significantly from device to device.

In other embodiments, back-offs may be provided to transmissions sent by device 116a to network 112 (WAN), where such back-offs are controllable by device 116a or where device 116a may be able to send a command to network 112 to initiate such a back-off.

In other embodiments, other adjustments may be made to one or more parameters of transmitted or received signals from one or both of networks 112 and/or 118. Such adjustments may be made due to interference and/or distortions in their transmitted/received signals due to transmitted/received signals from another network. For example, the timing and/or size of transmissions may be adjusted (as noted above) and/or the timing and/or sensitivities for received signals may be adjusted.

It will be appreciated that the parameters in the Tables and paragraphs above may be changed from according to a program or script, where several changes are made to one or more parameters as part of the script. For example, when one network condition is detected, an exemplary program or script may change the transmission level and then channel based on a passage of time or detection of other subsequent network condition(s). Other programs can be provided. It will further be appreciated that conditions may be imposed on when, how and if to change the above noted parameters.

It will further be appreciated that the data for the parameters in the Tables and paragraphs noted above may be stored locally on device 116a or may be provided to device 116a from a remote server or other device. As such, updates to the data, parameters and/or Tables may be provided to device 116a from time to time to reflect amendments to the parameters implemented in view of any recent regulatory or operational changes or improvements.

From the co-existence operating states and the LTE operating frequency, a matrix of four (4) LTE/WLAN exemplary co-existence states are provided:

State 1—No co-existence issues: where both the LTE and WLAN radios may operate concurrently or nearly concurrently with no co-existence interference or an acceptable amount of interference;

State 2—Co-existence of FDD communications for both networks with WLAN receiver sensitivities as "victim": where the WLAN receiver is experiencing de-sensing (as a "victim" network) due to LTE Band 7 transmissions;

State 3—Co-existence of TDD communications for both networks with both LTE and WLAN receiver sensitivities as "victims": where the LTE TDD (band 40/band 41) receiver and WLAN receiver are considered to be victims due to WLAN/LTE transmissions being an aggressor; and State 4—Co-existence of FDD communications for both networks with LTE receiver sensitivities as "victim": where LTE band 7 transmission and WLAN transmission cause inter-modulation interference with LTE receptions.

An embodiment provides consideration of one or more of the states in determining when a co-existence issue exists and how it is managed. Features of an embodiment for the states are described below. In other embodiments more or less co-existence states may be provided which may depend on other variables.

For state 1, typically WLAN and LTE communications are deemed to not be in interference with each other so no network management action is required. For states 2 to 4, an embodiment identifies when there is a co-existence issue and then identifies an adjustment that is made to one or both of the networks and implements same. One embodiment utilizes measurement of one or more types of signals received by the communication device from a network and compares it against a set of cumulative measurement criteria relating to the network. Selected features of embodiments that make evaluations and implement corrective actions are discussed below.

In one embodiment, signals for a WLAN network are assessed to determine if a reconfiguration of network parameters for a WLAN and/or an LTE network for a communication device should be implemented. Network signals received at the communication device are measured as a received strength signal indicator (RSSI) value. RSSI measurements may be taken constantly, periodically or on an event basis. The RSSI value is typically expressed in terms of absolute dBm, as a negative value. As such a RSSI value of −90 dBm is larger than a RSSI value of −100 dBm. For RSSI, a larger value represents a stronger received signal that is typically easier to detect than a weaker signal. If a communication device can process signals having a relatively smaller RSSI, the communication device is more sensitive, which may mean it has more sensitive radio components, which may be more expensive.

For an embodiment, a RSSI signal may be evaluated against a threshold provided by a set of parameters that include factors such as minimum expected RSSI values for a given network throughput, de-sense values for expected cross-network interferences and other values. For an embodiment, a de-sense value is an amount of sensitivity (in dB) that signals received at the communication device for one network (e.g. WLAN) are reduced in strength due to interference, including interference from transmissions from another network (e.g. a LTE network). If the detected RSSI value exceeds the threshold set by the equation, then for the given WLAN and LTE network configuration for the communication device, the WLAN throughput is determined to be acceptable. Conversely, if the detected RSSI value does not exceed the threshold of the equation, then that WLAN and LTE network configuration for the communication device does not meet operating conditions to receive signals from the WLAN. As such, a different network co-existence configuration for the WLAN and/or the LTE networks is identified and implemented. When the different network co-existence configuration is identified and implemented, it is expected that the ongoing detected RSSI values are improved. It will be appreciated that embodiments provide different thresholds for RSSI measurements and different sets of measurement criteria.

For one embodiment, a goal is to maintain or attempt to maximize WLAN received throughput. This situation may be useful when the communication device is attempting to download large data files (e.g. video files) from a WLAN while maintaining a sufficient connection to the LTE network. Features of exemplary embodiment that consider co-existence issues described earlier for states 2-4 are described below.

For state 2, it will be seen that a communication device may have different WLAN Rx de-sense levels with respect to different WLAN channels. In illustrating evaluating co-existence issues for state 2, for the sake of simplicity and illustration, and not limitation, a network environment for a communication device of an embodiment assumes that:

LTE transmission are at a maximum level (e.g. 23 dBm) using a maximum number of resource blocks (e.g.

100), thereby providing a transmission configuration that may tend to cause the most interference with WLAN Rx signals;

WLAN receptions use data rate adaption to overcome LTE transmission de-sense as much as possible without breaking the received signal reception link; and WLAN receptions operate in a 802.11g mode following data rate vs. sensitivity parameters as noted in Table C below:

TABLE C

| | Data Rate | | | | | | | | | | |
|---|---|---|---|---|---|---|---|---|---|---|---|
| | 54 | 54 | ... | 54 | 54 | 48 | 36 | 24 | 18 | 12 | 9 | 6 |
| RSSI reading (dBm) | −10.0 | −20.0 | −30.0 | −40.0 | −75.0 | −75.0 | −79.0 | −82.0 | −84.0 | −86.0 | −89.0 | −90.0 |

The communication device may identify a data of de-sense values for received signals in channels in a WLAN connection in the presence of LTE transmissions. Table D lists de-sense values for different channels on 802.11g received signals in the presence of LTE B7 transmissions at 2510 MHz using a 23 dB power level and 100 resource blocks.

TABLE D

| | WLAN Chan. | | | | | | | | | | |
|---|---|---|---|---|---|---|---|---|---|---|---|
| | 1 | 2 | ... | 5 | 6 | 7 | 8 | 9 | 10 | 11 | 12 | 13 |
| Rx de-sense (dB) | 0.0 | 0.0 | 0.0 | 0.0 | 0.0 | 0.0 | 2.3 | 8.3 | 9.7 | 10.7 | 11.0 | 11.3 |

Table D shows that for channel 13, a de-sense level of 11.3 dB has been determined, whereas between channels 1 and 7, there is no detected de-sense.

As such, in order to maintain 802.11g operation to the lowest data rate of 6 Mbps (Table C), Equation 1 is provided to determine whether to maintain the current 802.11g Rx operation or to enable an alternative WLAN Rx operation. One alternative Rx operation is to invoke a TDM scheme that does not monitor for WLAN Rx signals during the associated LTE B7 Tx time slot.

$$RSSI \geq S_{802.11g}(6 \text{ Mbps}) + W_d(Ch\#) \begin{Bmatrix} \text{True-maintain State 1} \\ \text{False-enable TDM} \end{Bmatrix} \quad \text{Equation 1}$$

Here, $S_{802.11g}$ (6 Mbps)=−90 dBm, is a determined WLAN 802.11g Rx sensitivity for a specific communication device or class of devices. For example, values in Table C may be used. $W_d$ (Ch#) is the WLAN Rx de-sense in dB at the receiver at each WLAN channel. For example, values in Table D may be used. Generally, an embodiment as represented by Equation 1, compares a current parameter of a received signal from a network (e.g. a measured signal strength from a WLAN) against corresponding threshold(s). In Equation 1, the threshold are set, in part, by a required sensitivity level for a given data rate for that network (e.g. $S_{802.11g}$ and another factor (e.g. an adjustment factor providing a de-sense value due to co-existence interference of another network on that network—here $W_d$). For Equation 1, the current parameter of a received signal is its strength, namely its RSSI. In other embodiments, other parameters may be used (e.g. relating to timing of received signals, size of received signals, source of received signals, etc.), which would have comparable thresholds for each. Equation 1 compares the RSSI against the threshold set by $S_{802.11g}$ and $W_d$ in a "greater than or equal to" comparison. It will be appreciated that comparable comparisons can be made for alternatives to Equation 1, where a comparison is made on a "greater than" basis, a "less than or equal to" basis or a "less than" basis, with adjustments made to actions taken or not taken as necessary.

It is noted that values in Table D may be provided for different LTE Tx power levels, such as transmissions at 23 dBm, 21 dBm, 19 dBm, 17 dBm and 15 dBm. The cellular-band modem provides this average transmission power level information to network management module (described below), which can access this information and check a respective victim table to identify a network and its parameter that is targeted for adjustment (generally decreasing its performance) in order to reduce co-existence conflicts of signals between the networks.

For each LTE B7 Tx power level, data in Table D may be supplemented with values for different RB values, from 100, 75, 50, 25, 10, 5 or other values for the RB (as shown in Tables E(1) and E(2)).

As such, it can be seen that, $W_d$ (Ch#) in Equation 1 is also a function of LTE B7 frequency, a transmission power level and the number of resource blocks used.

Turning now to a description of systems, algorithms, methods, processes and devices provided by an embodiment in identifying and processing co-existence issues for state 3, for an embodiment a goal is to maintain or attempt to maximize WLAN received throughput for a communication device. This goal may be useful when the communication device is attempting to download large data files (e.g. video files) from a WLAN while maintaining a sufficient connection to the LTE network.

In such a situation, Equation 2 provides a template for evaluating network conditions and when to implement a TDM configuration for WLAN and LTE network transmissions.

$$RSSI \geq S_{802.11g}(6 \text{ Mbps}) + W_d(Ch\#) + T_{opt} \begin{Bmatrix} \text{True-maintain State1} \\ \text{False-enable TDM} \end{Bmatrix} \quad \text{Equation 2}$$

Equation 2 builds on the features of Equation 1. In Equation 2, $T_{opt}$ is an adjustment factor that may be either positive or negative and is expressed in dB, but in one embodiment it is a positive value. The adjustment factor may provide adjustments that reflect signal adjustments to address certain environment and/or operating conditions for the communication device and its connections to the networks (e.g. to the WLAN and LTE network). For example, the relative proximity of the communication device to its AP (e.g. near the AP or towards an edge of the AP coverage) will affect the RSSI reading. It will be seen that the WLAN de-sense value will be affected by environmental factors with the WLAN for the specific location of the communication device. Values for the $T_{opt}$ factors may be affected by communication parameters of one or both networks communicating with the communication device. For example, $T_{opt}$ may be affected by a duty cycle of transmissions for the LTE network transmitter for the communication device, where the larger the duty cycle, the higher the amount of interference and so the higher the value of $T_{opt}$.

Specific exemplary values may be provided by measurements in laboratory and field environments using a collection of communication devices for the $T_{opt}$ factor. Communication devices of different types and models may have different adjustment values.

Table E(1) provides exemplary data of de-sense levels of a section of WLAN channel 13 in the presence of LTE B7 transmissions at different power levels and different resource block levels.

TABLE E(1)

| | | WLAN Rx | | | | | |
|---|---|---|---|---|---|---|---|
| | | | | Chan. | | | |
| | | 13 | 13 | 13 | 13 | 13 | 13 |
| | | | | LTE B7 | | | |
| | | | | Chan. | | | |
| Res. Blk | | 20850 100 | 20850 75 | 20850 50 | 20850 25 | 20850 10 | 20850 5 |
| Tx | 23 | 11.3 | 8.5 | 2.8 | 1.2 | 0.0 | 0.0 |
| pwr | 21 | 7.8 | 4.2 | 1.5 | 0.0 | 0.0 | 0.0 |
| (dBm) | 19 | 4.5 | 1.8 | 1.2 | 0.0 | 0.0 | 0.0 |
| | 17 | 2.5 | 1.5 | 0.0 | 0.0 | 0.0 | 0.0 |
| | 15 | 1.5 | 1.2 | 0.0 | 0.0 | 0.0 | 0.0 |

Table E(2) provides exemplary data of de-sense levels of a section of WLAN channel 12 in the presence of LTE B7 transmissions at different power levels and different resource block levels.

TABLE E(2)

| | | WLAN Rx | | | | | |
|---|---|---|---|---|---|---|---|
| | | | | Chan. | | | |
| | | 12 | 12 | 12 | 12 | 12 | 12 |
| | | | | LTE B7 | | | |
| | | | | Chan. | | | |
| Res. Blk | | 20850 100 | 20850 75 | 20850 50 | 20850 25 | 20850 10 | 20850 5 |
| Tx | 23 | 11.0 | 7.3 | 2.3 | 0.0 | 0.0 | 0.0 |
| pwr | 21 | 7.3 | 3.3 | 0.0 | 0.0 | 0.0 | 0.0 |
| (dBm) | 19 | 3.3 | 1.8 | 0.0 | 0.0 | 0.0 | 0.0 |
| | 17 | 2.0 | 1.3 | 0.0 | 0.0 | 0.0 | 0.0 |
| | 15 | 1.0 | 0.0 | 0.0 | 0.0 | 0.0 | 0.0 |

Data for additional de-sense values for other WLAN channels (e.g. channels 8-11) in the presence of LTE B7 transmissions can be collected and tracked by an embodiment.

From Tables D and E(1), where the communication device has its WLAN radio receiving signals at channel 13 and its LTE radio transmitting signals at 2510 MHz with 23 dBm and 100 RB, the data indicates that there is a de-sense of approximately 11.3 dB for received WLAN signals. As such, the communication device may be in one of at least three different environments for the WLAN:

(1) When the communication device is relatively "near" to an AP, its RSSI for received AP signals may be relatively strong (e.g. about −60 dBm or larger). From data in Table C, it can be seen that the communication device may tolerate a de-sense (i.e. a loss) of 11.3 dB signal, while still maintaining 802.11g 54 Mbps data rate, since the smallest acceptable RSSI signal in Table C that still meets the 54 Mbps rate is −75 dBm that, when adjusted by the de-sense value of 11.3 dB, produces a minimum required signal strength of −63.7 dBm (−75 dBm+11.3 dB=−63.7 dBm), which is below the strength of the signals being received at −60 dBm. Therefore, the WLAN Rx throughput would not be affected;

(2) When the communication device is on an edge of AP coverage, its RSSI readings may be relatively weak (e.g. about −90 dBm or smaller). Here, with a de-sense value of 11.3 dB, it can be seen that the WLAN Rx link is susceptible to being broken. Again, the minimum required signal strength is −63.7 dBm (−75 dBm+11.3 dB=−63.7 dBm for the network parameters), which is above the strength of the signals being received at −90 dBm. As such, to maintain the WLAN Rx link, an alternative co-existence arrangement between the WLAN and the LTE network for the communication device should be implemented. One arrangement is to enable a TDM mode that does not monitor for WLAN signals (i.e. the device stops receiving WLAN signals) during a LTE B7 Tx burst; or (3) The communication device is at a "middle" distance to its AP, its RSSI readings may be not overly strong or weak (e.g. about −75 dBm). If the communication device maintains the WLAN data rate adaption to overcome 11.3 dB Rx de-sense, the communication device may have 802.11g data rate of approximately between 9 and 12 Mbps (for example, based on shifting data rate values shown in Table C). As such, the Rx signal throughput of the communication device may drop proportionally (e.g. which may track the data rate change from 54 Mbps to 9 Mbps in Table C). If the communication device selects an alternative co-existence arrangement (e.g. utilizing a TDM mode), then the communication device would not process WLAN Rx signals during a LTE B7 Tx burst and as such, it may be able to maintain a 54 Mbps of data rate. The communication device will make a determination as to whether or not to change to a TDM mode. This determination may depend on one or more factors, such as:

The value of the duty cycle provided to transmissions LTE B7 in TDM mode; and

The value of any time latencies from switching between a TDM mode to a non-TDM mode with a higher data rate during the absence of LTE Tx burst.

In implementing a TDM mode, an embodiment provides an adaptive threshold setting of TDM mode. One threshold may be set by analyzing a transmission duty cycle in the LTE network (e.g. operating in B7) and then identifying and setting an appropriate RSSI threshold for activating a TDM mode.

For an embodiment, a current value of the RSSI may be estimated and adopted and from that value, a determination may be made as to an expected Rx WLAN throughput provided if the co-existence state 1 is maintained. For example, if the LTE B7 Tx duty cycle is about 50%, the communication device should obtain about 27 Mbps of data rate (i.e. 50% of 54 Mbps) by utilizing a TDM mode. If a value for the RSSI is set to be about −70 dBm, then based on data in Table C showing about 11.3 dB de-sense, the communication device would be expected to have an Rx WLAN throughput of approximately 24 Mbps by maintaining the WLAN rate adaption and not switching to a TDM mode. As such, an embodiment may adopt the RSSI value to be approximately −70 dBm as a threshold for 50% duty cycle of LTE Tx. Then, in Equation 2, $T_{opt}$ may be set to 8.7 dB. Other values for $T_{opt}$ may be provided based on experimental data and/or field data from communication devices in operation. $T_{opt}$ may change for different models/makes/manufacturers/versions of communication devices.

In this configuration, when RSSI is measured as −75 dBm (i.e. worse than the threshold), communication device has better WLAN Rx performance by implementing a TDM mode that maintains a throughput of about 27 Mbps compared to maintaining WLAN rate adaption that would provide a Rx WLAN throughput of approximately 9 to 12 Mbps.

It will be seen that different WLAN channels have different de-sense values. For example extrapolating from Tables E(1) and E(2), when the WLAN is operating at channel 8 and has only about 2.3 dB of de-sense, then the benefit from TDM mode reduced as an effect of de-sense on this channel may be less compared to an effect on de-sense on higher channels. Therefore, the maximum throughput may be more easily achieved without implementing a TDM scheme. It has been determined that in conditions where there is a higher WLAN Rx de-sense value, there are greater throughput gains provided by adopting a TDM co-existence plan. As such, an embodiment may utilize a "standard" LTE B7 diplexer and a "standard" WLAN Band Pass filter to process the WLAN Rx de-sensing that is due to LTE B7 Tx, which may utilize less expensive components, compared more sensitive diplexers that need to detect smaller values of de-sensing.

Now a description of systems, algorithms, methods, processes and devices for evaluating co-existence issues for state 4 by an embodiment are provided, where LTE Rx signals are de-sensed due to simultaneous LTE/WLAN transmissions.

Table F provides exemplary data for a network "victim" identify for a communication device that identifies exemplary "cut-back" network situations where a co-existence conflict exists with transmissions from both the WLAN and LTE networks. Here a transmission "cut-back" level is provided for transmissions for the LTE network from the communication device are set, which would at least alleviate the conflict. For data collected in Table F, the communication device is transmitting WLAN 802.11g signals at 6 Mbps and LTE signals at a maximum LTE transmission power of 23 dBm using 100 resource blocks. A goal is to set an LTE transmission cut-back level (in dBm) to bring LTE Rx de-sense within 3 dB. "NC" in a cell refers to "no cut-back". The numeric values represent an amount of cut-back that may be implemented (in dBm).

TABLE F

| LTE FREQ. | WLAN CH#1 | WLAN CH#2 | WLAN CH#3 | WLAN CH#4 | WLAN CH#5 | WLAN CH#6 | WLAN CH#7 | WLAN CH#8 | WLAN CH#9 | WLAN CH#10 | WLAN CH#11 | WLAN CH#12 | WLAN CH#13 |
|---|---|---|---|---|---|---|---|---|---|---|---|---|---|
| 2510 MHz | NC | NC | NC | NC | NC | NC | NC | NC | NC | NC | NC | NC | NC |
| 2520 MHz | NC | NC | NC | NC | NC | NC | NC | NC | NC | NC | NC | NC | NC |
| 2530 MHz | 15 | 17 | NC | NC | NC | NC | NC | NC | NC | NC | NC | NC | NC |
| 2540 MHz | 13 | 13 | 15 | 17 | NC | NC | NC | NC | NC | NC | NC | NC | NC |
| 2550 MHz | NC | 15 | 15 | 15 | 15 | 17 | NC | NC | NC | NC | NC | NC | NC |
| 2560 MHz | NC | NC | 17 | 15 | 13 | 13 | 15 | 17 | NC | NC | NC | NC | NC |

Table G provides exemplary data of part of LTE B7 Rx de-sense values in dB at for an LTE transmission channel of 2560 MHz with different LTE transmission levels, resource blocks and WLAN transmission levels.

TABLE G

| | | | WLAN Rx | | | | | | |
|---|---|---|---|---|---|---|---|---|---|
| | | | TxPwr (dBm) | | | | | | |
| | | | 17 | 17 | 17 | 17 | 17 | 17 | 17 |
| | | | | | | Chan. | | | |
| | | | 1 | 2 | 3 | 4 ... | 11 | 12 | 13 |
| LTE B7 | 23 | 1 | 0.0 | 0.0 | 1.0 | 3.5 | 0.0 | 0.0 | 0.0 |
| | | 10 | 0.0 | 0.0 | 1.0 | 3.0 | 0.0 | 0.0 | 0.0 |
| | | 25 | 0.0 | 0.0 | 0.0 | 1.5 | 0.0 | 0.0 | 0.0 |
| | | 50 | 0.0 | 0.0 | 0.0 | 0.5 | 0.5 | 0.0 | 0.0 |
| LTE B7 | 21 | 1 | 0.0 | 0.0 | 1.0 | 3.5 | 0.5 | 0.5 | 0.5 |
| | | 10 | 0.0 | 0.5 | 0.5 | 1.5 | 0.0 | 0.0 | 0.5 |
| | | 25 | 0.0 | 0.0 | 0.0 | 1.0 | 0.0 | 0.0 | 0.0 |
| | | 50 | 0.0 | 0.5 | 0.5 | 0.5 | 0.5 | 0.0 | 0.0 |
| LTE B7 | 19 | 1 | 0.5 | 0.0 | 1.0 | 1.5 | 0.0 | 0.0 | 0.0 |
| | | 10 | 0.5 | 0.0 | 0.5 | 1.0 | 0.0 | 0.0 | 0.0 |
| | | 25 | 0.0 | 0.0 | 0.0 | 0.0 | 0.0 | 0.0 | 0.0 |
| | | 50 | 0.0 | 0.0 | 0.0 | 0.0 | 0.0 | 0.0 | 0.0 |
| LTE B7 | 17 | 1 | 0.0 | 0.0 | 0.0 | 0.0 | 0.0 | 0.0 | 0.0 |
| | | 10 | 0.0 | 0.0 | 0.0 | 0.0 | 0.0 | 0.0 | 0.0 |
| | | 25 | 0.0 | 0.0 | 0.0 | 0.0 | 0.0 | 0.0 | 0.0 |
| | | 50 | 0.0 | 0.0 | 0.0 | 0.0 | 0.0 | 0.0 | 0.0 |

In illustrating evaluating co-existence issues for state 4, for the sake of simplicity and illustration, and not limitation, the following network parameters are assumed:

The LTE transmission from the communication device are provided at a power level of a maximum level (e.g. 23 dBm) with the maximum resource blocks (e.g. 100), thereby providing the most intensive transmission configuration that would tend to cause the most interference with WLAN Rx signals;

WLAN receptions use data rate adaption to overcome LTE Tx de-sense as much as possible without breaking the Rx reception link;

WLAN receptions operate in a 802.11g mode following data rate vs. sensitivity parameters as noted in Table C (above); and Link budgets for both uplink communications from the networks to the communication device and downlink communications from the device to the networks are balanced, where balanced budgets indicate that the uplink link budget is the same as the downlink link budget. As such, a device can send uplink frames at the same rate that a peer device can send downlink frames.

For these network configurations, Table A below (LTE Frequency at 2560 MHz) to determine when TDM mode will be enabled.

For an embodiment, in order to maintain 802.11g operation at the minimum data rate of 6 Mbps with a balanced link budget, an embodiment applies the following Equation 3 to determine whether to either: 1) maintain the 802.11g link (e.g. by either cutting or reducing the transmitting power); or 2) enable a TDM, which will stop WLAN Tx during LTE B7 Tx time slot.

$$RSSI \geq S_{802.11g}(6 \text{ Mbps}) +$$
$$W_c(Ch\#) \begin{Bmatrix} \text{True-cut } WLAN \text{ } Tx \text{ Power to } W_{ct}(Ch\#) \\ \text{False-enable } TDM \end{Bmatrix} \quad \text{Eq. 3}$$

For this example, $S_{802.11g}$ (6 Mbps)=−90 dBm, which is the determined WLAN 802.11g Rx sensitivity of a specific communication device. $W_c$ (Ch#) is the WLAN 802.11g 6 Mbps transmission cut-back amount in dB. As well, in this example:

$$W_c(Ch\#)=19 \text{ dBm}-W_{ct}(Ch\#) \quad \text{Equation 4}$$

Where 19 dBm is a maximum WLAN 802.11g 6 Mbps transmission power level that a communication device and front end (communication) module may provide to the antenna port of the communication device. $W_{ct}$(Ch#) is the level to which transmission power should be cut to, to reduce the LTE Rx sensitivity to be within 3 dB.

For example, if LTE Tx is operating at 2560 MHz and WLAN is at channel 6, then based on Table 6, $W_{ct}$(Ch#)=13 dBm. As such, $W_c$(Ch#)=19 dBm−13 dBm=6 dB using Equation 4.

For the above noted schemes, when a TDM scheme is implemented, parameters for the duty cycle(s) of the networks needs to be provided. One basic scheme is to share a transmission period approximately equally (e.g. providing each network with about, but no more than 50% of the bandwidth). Other duty cycles may be provided. For example, if network access for a WLAN are deemed to be more important than network access to the LTE network, then a duty cycle may be selected that provides more than 50% of the bandwidth to the WLAN and a portion of the available remaining bandwidth to the LTE network (e.g. 80/20 split, 75/25 split, 66/33 split, 33/66 split, 25/75 split, 20/80 split etc.). The duty cycle may change while the TDM scheme is in place.

It will be appreciated that RSSI readings (and the related data) may be provided at any time to device 116a for an embodiment from any source. As well, thresholds for the above noted Equations may be dynamically changed, depending on network conditions and/or the state of device 116a.

Equations 1-3 compares the RSSI against their respective thresholds in a "greater than or equal to" comparison. It will be appreciated that comparable comparisons can be made for respective alternatives to Equations 1-3, where a comparison is made on a "greater than" basis, a "less than or equal to" basis, a "less than" basis, an "equal to" basis or an "approximately equal to" basis, with adjustments made to actions taken or not taken as necessary.

Having described features of an embodiment in processing co-existence states 1-4, further details is provided on an exemplary set of processes that an embodiment may execute, in series and/or in parallel to implement features of an embodiment.

FIGS. 3-7 show five processes 300, 400, 500, 600 and 700 that may be implemented in one or more modules, applications and/or firmware as software operating on a communication device of an embodiment. These processes generally provide at least two actions through corresponding evaluations actions:

Implementation of a WLAN Rx de-sense via implementing a WLAN Rx TDM reception mode, which may be based on thresholds and tests shown in Equation 1;

Implementation of an LTE Rx de-sense (e.g. in B7) through at least one of:

a. Implementing a WLAN transmission TDM mode, where for example WLAN transmissions from the communication device are not sent during a LTE (B7) transmission slot; or b. Implementing a cut-back of WLAN transmission power scheme based on thresholds and tests shown in Equations 3 and 4.

As part of the LTE Rx de-sense, for an embodiment, it is noted that a regulatory body in a jurisdiction may set regulations as to various communication parameters for communication devices and communication networks. For example, in the U.S. the Federal Communication Commission (FCC) has established limits for deemed safe exposure levels to radio frequency (RF) energy for communication devices. These limits are expressed as a Specific Absorption Rate (SAR), which is a measure of the amount of RF energy absorbed by a user's body when using a mobile communication device that is held near the user.

To meet current FCC SAR limits, a communication device may limit the power of transmissions sent from its antennae for transmissions sent over one or more networks. Generally, the lower the power of the transmission, the lower the amount of energy in the transmission that is absorbed by the user's body. The total amount of energy absorbed may also be decreased by decreasing the total amount of transmissions sent from the communication device to one or more networks. Parameters for such regulations may be amended from time to time. New regulations and requirements may be implemented.

To meet FCC SAR limit during simultaneous LTE transmission (e.g. in Band 7) and WLAN transmissions, an additional cut-back of power for WLAN transmissions may be made in certain circumstances. For example, Table H below shows a static matrix of transmission cut-backs from nominal 19 dBm to 17 dBm, where the Wi-Fi 2.4 GHz power level is nominally cut-back to 17 dB (from 19 dB—not shown) for the LTE B7 transmissions. Values in Table H represent exemplary target values. As such, the cut-back value represents an original value minus the target value.

TABLE H

| | | Wi Fi cut-back (in dB) | | | | |
| --- | --- | --- | --- | --- | --- | --- |
| Cellular Status | 2 4 GHz | Sub Band 4 34-38 5 GHz 36-64 | Sub Band 5 52-64 | Sub Band 6 100-116 5 GHz 100-140 | Sub Band 7 120-140 | Sub Band 8 149-165 5 GHz 149-165 |
| OFF | 19 | 19 | 19 | 19 | 19 | 17 |
| GSM 850 on | 18 | 17 | 17 | 19 | 19 | 14 |
| GSM 1900 on | 17 | 17 | 17 | 19 | 19 | 14 |
| GSM 900 on | 16 | 17 | 17 | 19 | 19 | 14 |
| GSM 1800 on | 15 | 17 | 17 | 19 | 19 | 14 |
| HSPA+ Band 1 on | 18 | 17 | 17 | 19 | 19 | 14 |
| HSPA+ Band 2 on | 17 | 17 | 17 | 19 | 19 | 14 |
| HSPA+ Band 5 on | 16 | 17 | 17 | 19 | 19 | 14 |
| HSPA+ Band 6 on | 16 | 17 | 17 | 19 | 19 | 14 |
| HSPA+ Band 8 on | 15 | 17 | 17 | 19 | 19 | 14 |
| LTE Band 3 on | 18 | 17 | 17 | 19 | 19 | 14 |
| LTE Band 7on | 17 | 17 | 17 | 19 | 19 | 14 |
| LTE Band 8 on | 16 | 17 | 17 | 19 | 19 | 14 |
| LTE Band 20 on | 15 | 17 | 17 | 19 | 19 | 14 |

Further details are provided for processes shown in each of FIGS. 3-7.

Figure 3:
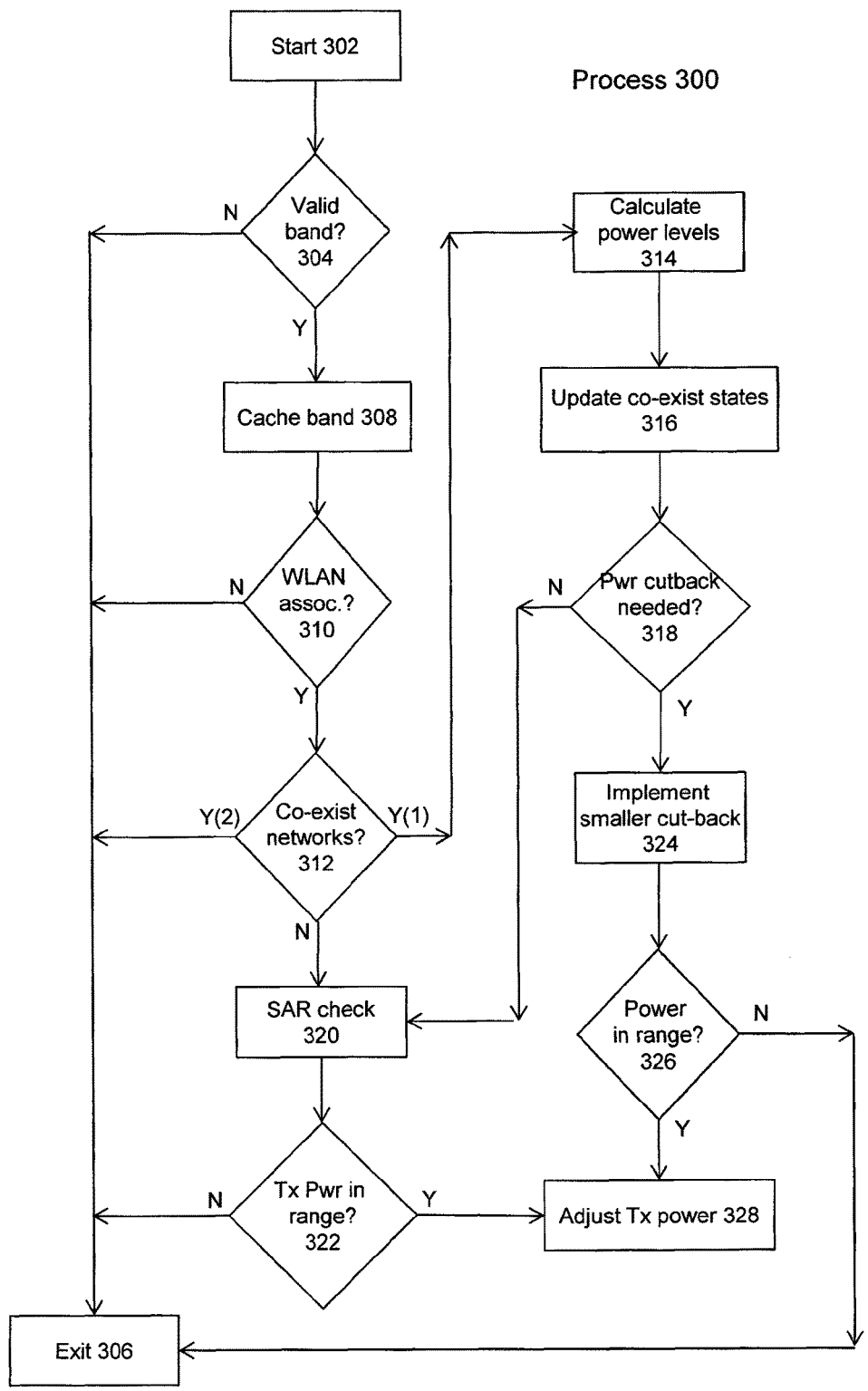
FIG. 3 is a flowchart of exemplary processes executed by the communication device of FIG. 1 in processing an update to a cellular transmission band for the wireless cellular communication network to be used by the communication device and determining when an adjustment is to be implemented to a communication parameter one of the networks according to an embodiment.

Referring to FIG. 3, process 300 shows exemplary processes executed on communication device 116a when an external request is received (for example from WAN 112) providing update information for a cellular sub-band for communications processed by device 116a to WAN 112. Process 300 begins at process 302, which may be initiated from a notification in device 116a issued when it is determined that the cellular radio of the device has moved to a new sub-band, such as those listed in Table H. Notifications may be issued from either a cellular communication module or a Wi-Fi communication module in device 116a that detects or is notified of such a movement. Next at process 304 a check is made to see if the requested sub-band update is valid. It may not be valid if the requested sub-band does not match an entry in a channel list table for a current radio frequency characterization of device 116a (i.e. is not recognized for the current WAN 112 configuration). If the sub-band value is not valid, then process 300 moves to exit process 306 as no further action should be taken. If the sub-band value is valid, then process 300 moves to process 306, where the value for the sub-band is stored and further processes are implemented to initiate the update. Next at process 310, an evaluation is made to determine whether there is a WLAN (e.g. WLAN 118) detected. If not, process 300 moves to exit process 306. If there is a WLAN detected, at process 312, an evaluation is made to determine whether there is a LTE/WLAN co-existence issue with the new sub-band for the cellular network and the connected WLAN channel. This may involve accessing network data for the WLAN and the cellular network (such as from Tables A-G) and making co-existence evaluations using any of Equations 1-4. Process 300 shows two alternative "yes" branches from process 312. Yes (2) branch is a secondary branch to the Yes (1) branch that may be taken to simply end process 300 through exit process 306. The Yes (1) branch is a preferred branch for one embodiment that provides further adjustment parameters for the WLAN and/or the cellular network. In the Yes (1) branch, first at process 314 new power levels for one or both of the WLAN and cellular networks may be identified. These levels may be identified using co-existence state (e.g. states 1-4) and possibly a preferred transmission power level for the WLAN. If the current state is state 4, a link budget may be determined from calculations and data relating to the power table lookup (e.g. Table A) and a SAR cutback value (from Table H). Next at process 316, updates to the co-existence states are implemented, as necessary. Next at process 318, a determination is made as to whether a (WLAN or LTE) transmission power cut-back should be implemented according to a LTE/WLAN co-existence requirement or a SAR requirement. In process 312, if a cut-back is not to be implemented, then process 300 moves to process 320, where a SAR check is performed (implementing a lookup to data such as data in Table H). Next at process 322, a determination is made as to whether a change in the transmission power level for the selected network is needed. If not, process 300 moves to exit process 306. If a change is needed, process 300 moves to process 328 that implements the identified adjustment to the power transmission level for the affected network. Returning to process 318, if a power cut-back is required, then process 300 moves to implement a (smaller) power level cut-back at process 324. Next at process 326 a check is made to determine if the adjusted power is in the proper range for the networks. If the range(s) are not proper then process 300 moves to exit process 306. If a range is proper then process 300 moves to process 328 to implement the change.

Although process 300 describes processes and facilities for device 116a to identify conditions and parameters for adjusting transmission levels for output signals sent to a network, other embodiments may provide adjustments that do not relate to network 118 or network 112.

An embodiment may implement part of all of functions described in process 300 in different orders or through different mechanisms (e.g. such as through a state machine). Process 300 may be operating in the background of device 116a. Process 300 may be implemented in an application program interface (API) that allows software and applications operating on device 116a to access the functionality of the API through a program call. As such, in an API, several calls may be received from several different applications operating on device 116a. In such a situation, the API may arbitrate among received requests to rank and/or combine the requests to determine overall parameters that are to be made for transmissions to network 118 and/or 112.

In other embodiments, the features of process 300 may be embedded in applications operating on other devices, such as AP 110b. In one embodiment, results and data may be sent to device 116a. As such, other processes and applications may be concurrently operating on device 116a or other devices.

It will be appreciated that processes 302, 304 and 306 may be executed in different orders and at different times than provided in process 300. It will be seen that process 300 may receive and react to external triggers and signals from device 116a to re-start process 300 (e.g. user intervention) to minimize process "freezing" conditions. For example, if device 116a is turned off and then turned on a network scan may be immediately useful to device 116a and as such, if process 300 had previously been activated, it may be terminated and a "hard" network scan request may be initiated.

Figure 4:
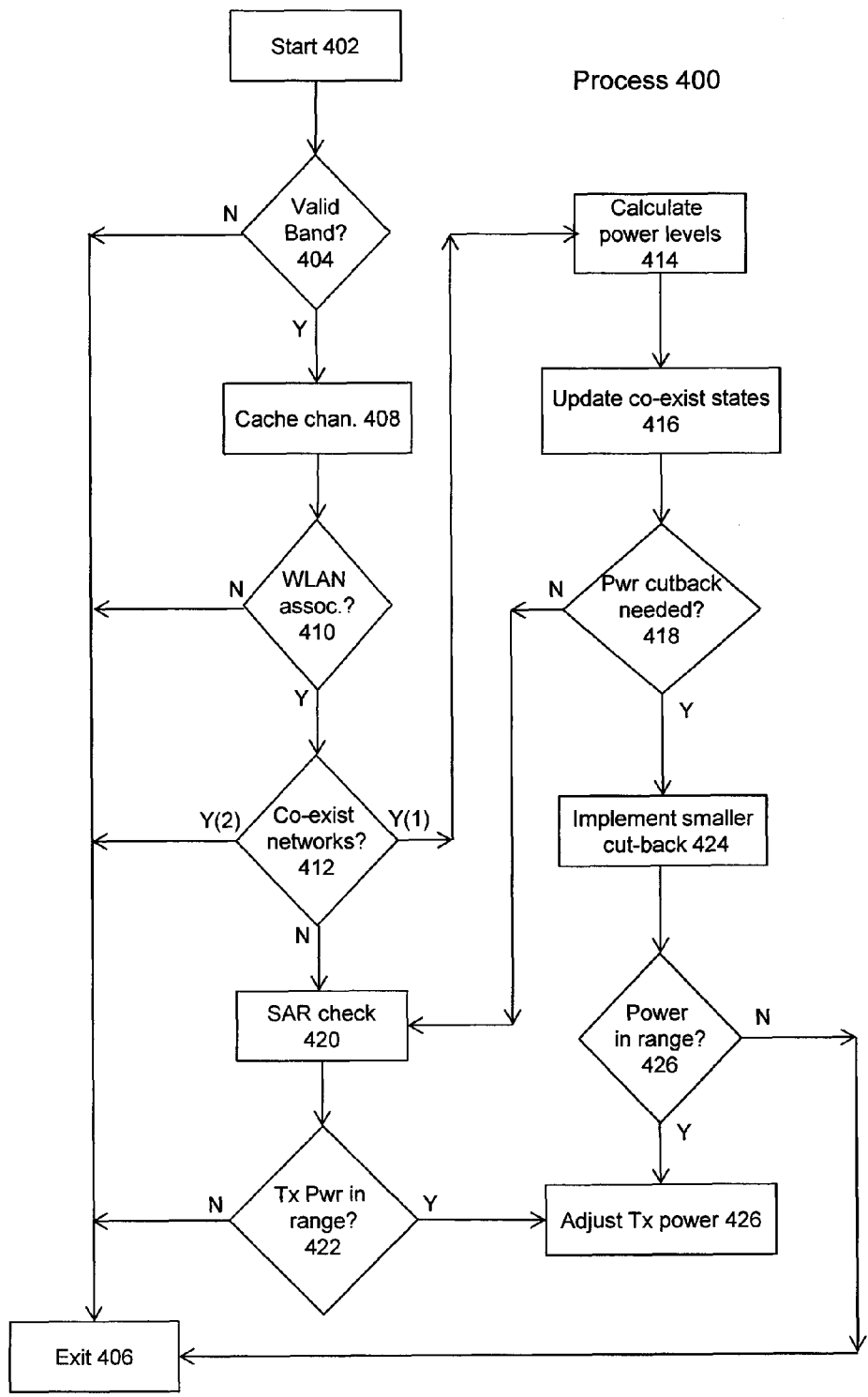
FIG. 4 is a flowchart of exemplary processes executed by the communication device of FIG. 1 in processing an update to a connection/channel update for the WLAN to be used by the communication device and determining when an adjustment is to be implemented to a communication parameter of one of the networks according to an embodiment.

Referring to FIG. 4, process 400 shows exemplary processes executed on communication device 116a when an external request is received (for example from WLAN 118) providing update information for a connection/channel for communications processed by device 116a to WLAN 118 or when a request is made to switch a WLAN operating mode for device 116a (e.g. between STA and MHS). Process 400 is similar in processes and flows shown for process 300, but for processes 404 and 406 check for the validity of the channel information provided and make appropriate updates if approved. Otherwise, processes 408-428 follow similar flows and actions as corresponding processes 308-328.

Figure 5:
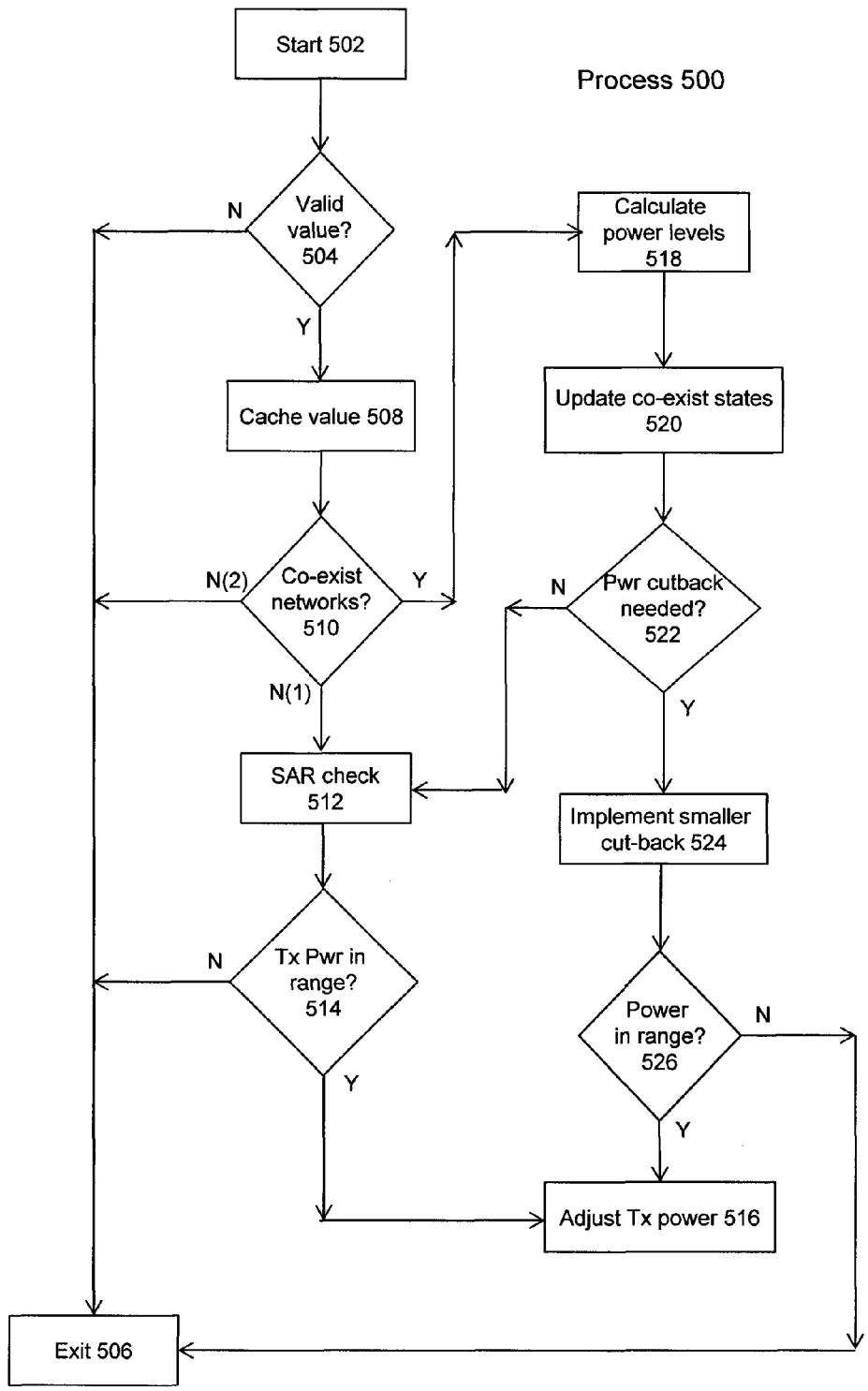
FIG. 5 is a flowchart of exemplary processes executed by the communication device of FIG. 1 in processing an update to a transmission state/frequency transmissions for the wireless cellular communication network to be used by the communication device and determining when an adjustment is to be implemented to a communication parameter of one of the networks according to an embodiment.

Referring to FIG. 5, process 500 shows exemplary processes executed on communication device 116a when a determination is made (for example by communication device 116a itself) that a state or frequency update may need to be implemented for a cellular communications processed by device 116a to WAN 112. Process 500 begins at process 502. Next at process 504 a check is made to see if the requested state or frequency update is valid. It may not be valid if the requested frequency is outside the operating parameters for the current WAN 112 configuration. If the request is not valid, then process 500 moves to exit process 506 as no further action should be taken. If the request is valid, then process 500 moves to process 508, where the value for the sub-band is stored and then further processes are implemented to initiate the update. Next at process 510, an evaluation is made to determine whether there is a co-existence issue with the new frequency/parameters for the cellular network and the detected WLAN. This may involve accessing network data for the WLAN and the cellular network (such as from Tables A-G) and making co-existence evaluations using any of Equations 1-4. Process 500 shows two alternative "no" branches from process 510 either of which may be taken if no co-existence issues are identified. The No (2) branch is a secondary branch that is an alternative to the No (1) branch and may be taken to simply end process 500 through exit process 506. The No (1) branch is a preferred branch for an embodiment that provides further adjustment parameters for the WLAN and/or the cellular network. In No (1) branch, first at process 512 a SAR check is performed (implementing a lookup to data such as data in Table H). Next at process 514, a determination is made as to whether a change in the transmission power level for the selected network is needed. If not, process 500 moves to exit process 506. If a change is needed, process 500 moves to process 516 that implements the identified adjustment to the power transmission level for the affected network. Returning to process 510, if a co-existence issue is detected, then process 500 moves process 518 to calculate new power levels for one or both of the WLAN and cellular networks. These levels may be identified using co-existence state (e.g. states 1-4) and possibly a preferred transmission power level for the WLAN. If the current state is state 4, a link budget may be determined from calculations and data relating to the power table lookup (e.g. Table A) and a SAR cutback value (from Table H). Next at process 520, updates to the co-existence states are implemented, as necessary. Next at process 522, a determination is made as to whether a transmission power cut-back is needed for either of the WLAN or cellular network. If no cutback is needed, then process 500 moves to process 512. If a power cut-back is needed, process 500 moves to process 524 to implement a (smaller) power level cut-back. Next at process 526 a check is made to determine if the adjusted power is in the proper range for the networks. If the range(s) is not proper then process 500 moves to exit process 506. If a range is proper then process 500 moves to process 516 to implement the power change.

Figure 6:
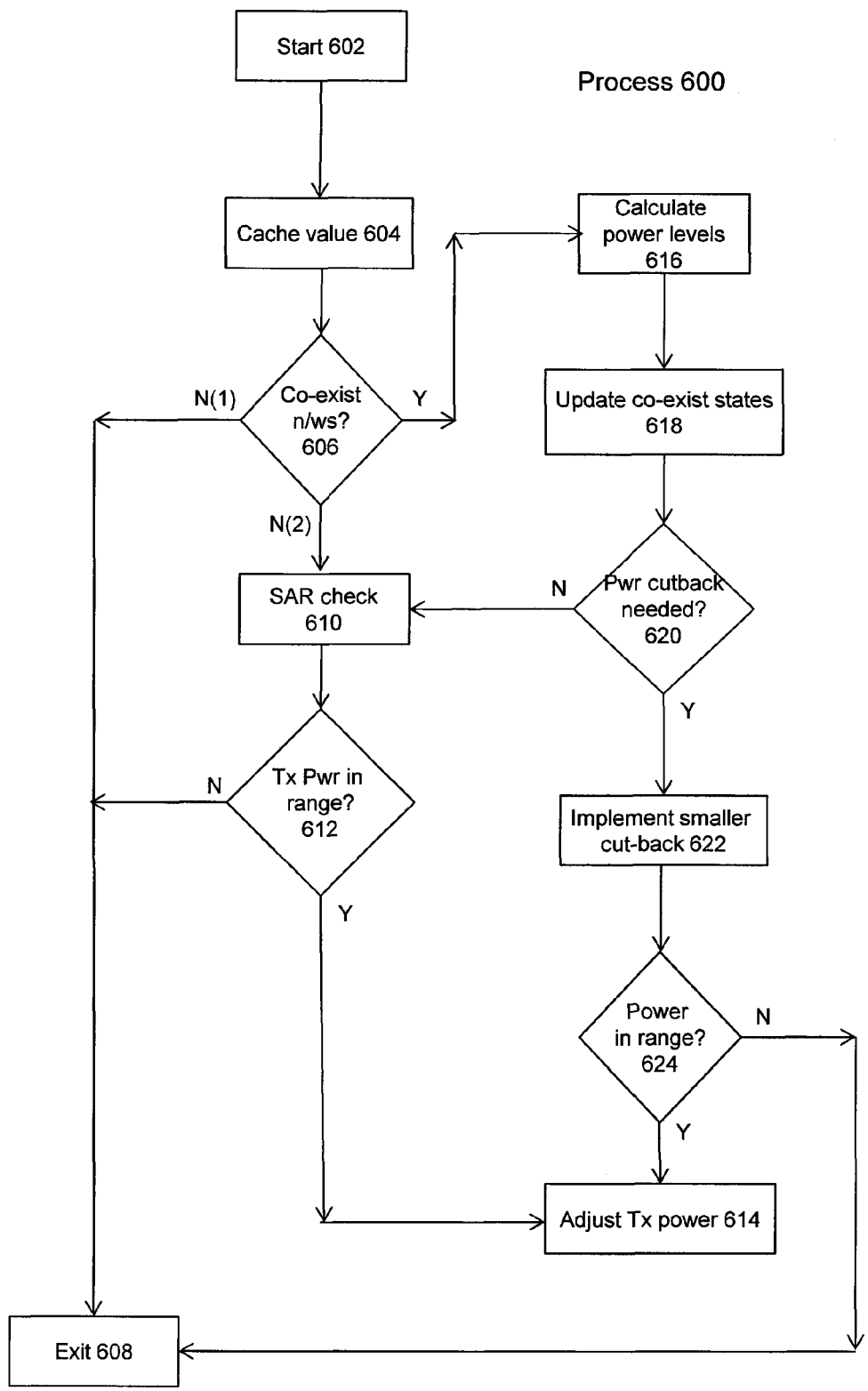
FIG. 6 is a flowchart of exemplary processes executed by the communication device of FIG. 1 in processing an update to a signal indicator threshold update for the WLAN to be used by the communication device and determining when an adjustment is to be implemented to a communication parameter of one of the networks according to an embodiment.

Referring to FIG. 6, process 600 shows exemplary processes executed on communication device 116a when a request is received providing update information for a RSSI levels (e.g. for WLAN communications) at device 116a. The request may be provided by device 116a or may be received from an external source. Process 600 is similar in processes and flows shown for process 500, but for process 504 may not be provided. Otherwise, processes 604-624 follow similar flows and actions as corresponding processes 508-526.

Figure 7:
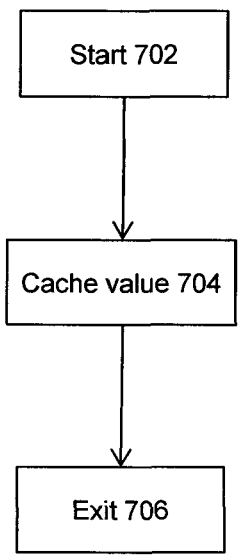
FIG. 7 is a flowchart of exemplary processes executed by the communication device of FIG. 1 in processing an update to a channel update for the WLAN to be used by the communication device and determining when an adjustment is to be implemented to a communication parameter of one of the networks according to an embodiment.

Referring to FIG. 7, process 700 shows exemplary processes executed on communication device 116a when a request is received providing update channel information for WLAN communication) at device 116a. The request may be provided by device 116a or may be received from an external source. Process 700 starts at process 702, then caches the channel information at process 704 then ends at process 706.

In processes 300-700 power adjustments are made to WLAN parameters. In other embodiments, power adjustments may be made to LTE parameters as well or instead of WLAN adjustments. Also, in processes 300-700, a WLAN may be operating in either a STA or MHS mode and may switch between modes. In other embodiments, variations can be provided from features implemented in processes 300-700. For example, the order of some processes may be changed; different actions may be taken decision points; different trigger conditions or a combination of a set of trigger conditions may be used to initiate any of a process.

Now details on specific monitoring, network transition, network reconfiguration and adjustment mechanisms provided by embodiments is provided. In order to determine when to make an adjustment to one or more transmission parameters, an embodiment monitors continually for network(s) detected by device 116a. As such, as one connection to a network (either, for example, a connection to network 112 or 118) is established, received signals are detected as being stronger, weaker and/or lost, depending on the current status of the connection, a parameter for communications transmitted to another network (for example network 118 or 112) may be adjusted.

In operation, device 116a has processes to monitor various network connections, such as WLAN and cellular connections (for example to networks 112 and 118) and to monitor states of connections (e.g. for a cellular network, a SVLTE state). In one embodiment, monitoring is provided by a component in an operating system of device 116a as this provides more flexibility for modifications. Upon detection of a state change, device 116a accesses data (such as states in the Tables and the Equations noted above) and determines whether an adjustment is to be made to a parameter. If an adjustment is to be implemented, the adjustment that may be based on values in the Tables or on additional conditions and data. The component may be implemented as a software driver that can determine the state of the network connections for device 116a; identify any transmission parameter changes to be made; and implement the changes.

Figure 8:
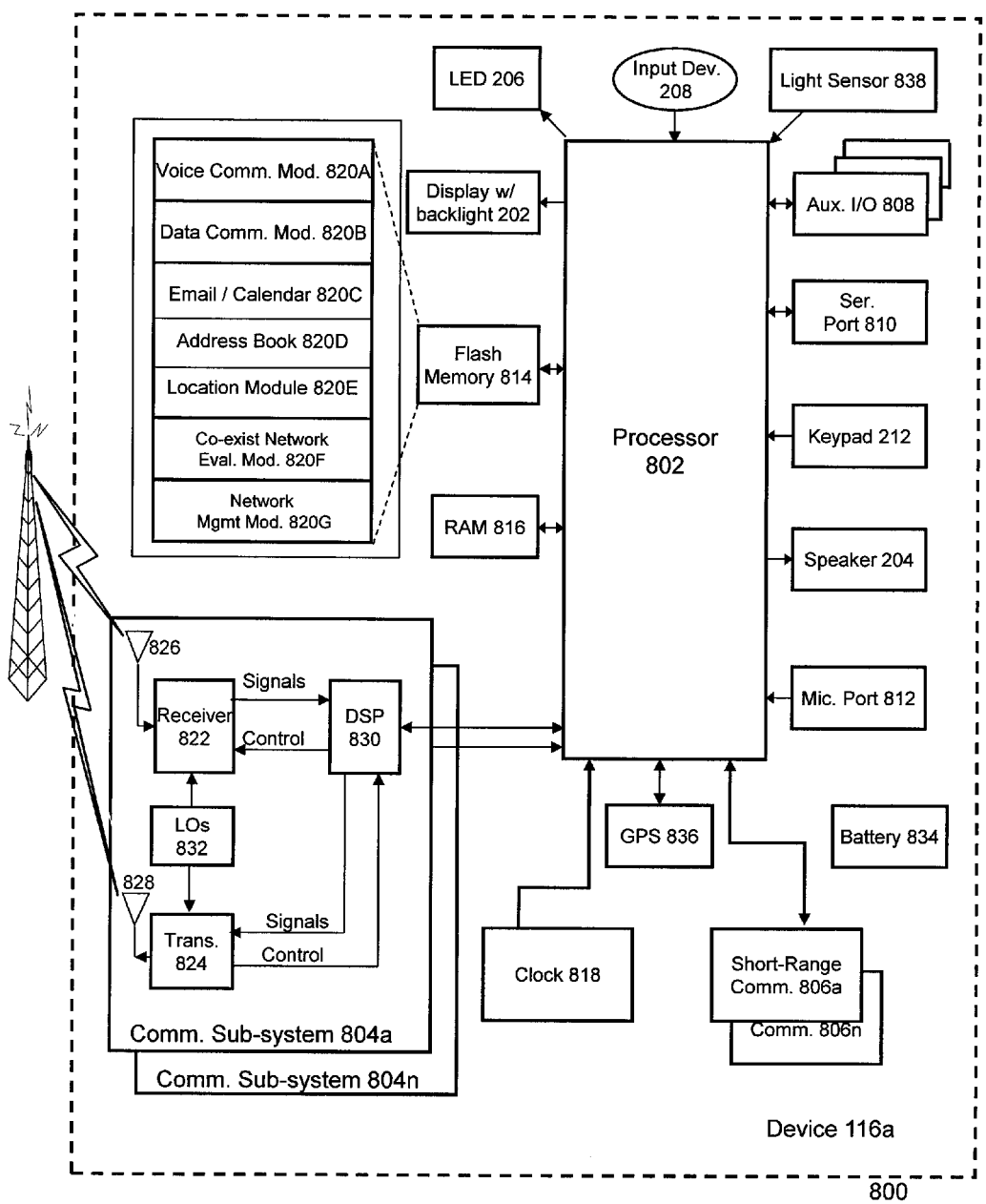
FIG. 8 is a block diagram of internal components of the communication device of FIG. 1.

Referring to FIG. 8, with aspects of main features of an embodiment described, further detail is now provided on internal components in device 116a, which may be also found in device 104d and AP 110b. Functional components of device 116a are provided in schematic 800. The functional components are generally electronic, structural or electro-mechanical devices. In particular, processor 802 is provided to control and receive almost all data, transmissions, inputs and outputs related to device 116a. Processor 802 is shown schematically as coupled to keypad 212 and other internal devices. Processor 802 preferably controls the overall operation of device 116a and its components. Exemplary processors for processor 802 include processors in the Data 950 (trade-mark) series, the 6200 series and the PXA900 series, all available at one time from Intel Corporation. Processor 802 is connected to other elements in device 116a through a series of electrical connections to its various input and output pins. Processor 802 has an IRQ input line which allows it to receive signals from various devices and modules. Appropriate interrupt firmware is provided which receives and reacts to the signals detected on the IRQ line. An interrupt signal may be used to indicate a request to terminate the segmented scanning mode of an embodiment.

In addition to processor 802, other internal devices of device 116a are shown schematically in FIG. 8. These include: display 202; speaker 204; keypad 212; communication sub-systems 804; short-range communication sub-systems 806; auxiliary I/O devices 808; serial port 810; microphone port 812 for microphone 216; flash memory 814 (which provides persistent storage of data); random access memory (RAM) 816; clock 818 and other device sub-systems (not shown). Device 116a is preferably a two-way radio frequency (RF) communication device having voice and data communication capabilities. In addition, device 116a preferably has the capability to communicate with other computer systems via the Internet.

Operating system software executed by processor 802 is preferably stored in a computer-readable medium, such as flash memory 814, but may be stored in other types of memory devices, such as read-only memory (ROM) or similar storage element. In addition, system software, specific device applications, or parts thereof, may be temporarily loaded into a volatile store, such as RAM 816. Communication signals received by device 116a may also be stored to RAM 816.

In addition to an operating system operating on device 116a, additional software modules 820 enable execution of software applications on device 116a that provide instructions for execution on the processor of device 116a. A set of software (or firmware) applications, generally identified as modules 820, that control basic device operations, such as voice communication module 820A and data communication module 820B, may be installed on device 116a during manufacture or downloaded thereafter. As well, other software modules are provided, such as email/calendar module 820C, address book 820D, location module 820E and co-existence network evaluation module (CNEM) 820F. CNEM 820F implements and initiates processes to evaluate network connections and to identify and initiate changes to network communication parameters per processes 300-700. The changes may be implemented by other modules in device 116a. For example, data relating to network operation/configuration parameters such as those provided in Tables A-G may be accessed to determine whether an adjustment is to be made and if so, what adjustments. As such, CNEM 820F may have call routines built into it to make one or more calls to an API (as described herein) to request that device 116a retrieve network connection information on one or more networks. The content and frequency of the API calls can be tailored to the requirements of the API, as described herein. In another embodiment, a plurality of CNEMs 820F may be provided, with each implementing processes to evaluate specific network connections (e.g. LTE, CDMA, etc.) and operating parameters (e.g. what frequencies are being used for a given network).

Messages received and/or generated by any module 820 may be processed by data communications module 820B. Messages may be transmitted/received in network layer communications, emails, and/or other messaging systems to network 118, AP 110b and/or devices 116. Module 820B receives messages from external devices, extracts relevant information from them and provides the information to relevant modules. Module 820B notifications from modules 820, extracts relevant information from them and generates and sends messages containing relevant information to the messages to network 118, including to devices 110. Messages relating to network 112 for device 116a, when operating as an AP may be processed separately by the modules from other non-network 118 communications (e.g. cellular communications).

Network management module (NMM) 820G provides an interface from CNEM 820F to any of communication sub-system 804n, short range communication system 806, voice communication module 820A and data communication module 820B to receive parameter adjustment instructions from CNEM 820F and to identify and provide appropriate adjustments to the identified parameter for the affected network as identified in processes 300-700. Such adjustments may include reductions to transmission signals sent by device 116a to WLAN 118 in order to reduce the sensitivity of NMM 420G is software and/or firmware that processes network functions for network 118 for device 116a. In an embodiment NMM 820G receives request for a network parameter adjustment from CNEM 820F and implements same on the appropriate network. Depending on the values of the parameters, NMM 820G may cause an output transmission level for a network to be adjusted on device 116a following parameters identified Tables A-G, for example. NMM 820G may also receive signals from other modules (or from other devices communicating with device 116a) to implement such parameter adjustments. Processes to evaluate and authenticate adjustment requests from other devices may be provided in NMM 820G. Communications also can be processed with an external server. Functions of NMM 820G may be distributed to other modules 820 in device 116a. In another embodiment, a plurality of NMMs 820G may be provided, with each implementing processes to adjust specific network connections (e.g. LTE, CDMA, etc.) and operating parameters (e.g. what frequencies are being used for a given network).

For a device architecture model, such as the OSI model, NMM 820G provides functionality above a radio layer and monitors and communicates state changes to a CNEM 820F that is associated with each radio. CNEM 820F is responsible for conducting data and table lookups and to configure a power transmission parameter (e.g. either as a limit or a minimum value) or any other parameter on the radio.

Additional modules such as personal information manager (PIM) application may be provided. Any module may be installed during manufacture or downloaded thereafter into device 116a.

Data associated with each module, the status of one or more networks, profiles for networks and trigger conditions for commands for networks may be stored and updated in flash memory 814.

Communication functions, including data and voice communications, are performed through communication sub-systems 804a . . . n and short-range communication sub-system 806. Collectively, sub-systems 804 and 806 provide the signal-level interface for all communication technologies processed by device 116a. Various applications 820 provide the operational controls to further process and log the communications. Communication sub-system 804 includes receiver 822, transmitter 824 and one or more antennas, illustrated as receive antenna 826 and transmit antenna 828. A filter (not shown) may be provided in transmitter 824 and/or around antenna 828 to block out signals that are outside an expected frequency range of signals transmitted by transmitter 824. Such a filter may operate as a band pass filter to reduce intermodulation distortion on other signals. In addition, communication sub-system 804 also includes processing modules, such as digital signal processor (DSP) 830 and local oscillators (LOs) 832. The specific design and implementation of communication sub-system 804 is dependent upon the communication network in which device 116a is intended to operate. For example, communication sub-systems 804a . . . n of device 116a may collectively operate on network technologies described earlier (e.g. NFC, GPRS, IEEE 802.11 networks, IEEE 802.11 P2P networks, Bluetooth networks, Zigbee, television-band whitespaces or other geo-location database dependent technologies, AMPS, TDMA, CDMA, CDMA 2000, PCS, GSM, WWAN, WMAN, WLAN, WPAN, IM, TM, SMS, etc.). Separate sub-systems 804a . . . n may be provided for different communication technologies in device 116a. Each sub-system 804a . . . n may generate independent signals and provide same to other modules in device 116a and similarly other modules in device 116a may generate and provide separate notifications and/or signals to individual sub-systems 804a . . . n. Separate antennae 826, 828 may be provided for each communication network (e.g. LTE, UMTS, etc.) for each sub-system 804a . . . n. Some exemplary sub-systems 804 include: cellular sub-system 804a, WLAN sub-system 804b and others. One configuration for sub-systems 804a . . . n provide separate antennae for different communication system (e.g. an 802.11 antennae is separate from an LTE or UMTS sub-system). Signals from modules 804 may be analyzed (by other modules in device 116a) as RSSI values to determine whether a connection to the related network is active or not for device 116a.

Short-range communication sub-system 806 enables communication between device 116a and other proximate systems or devices, which need not necessarily be similar devices. In one embodiment, several sub-systems 806a . . . n may be provided for different communication technologies. For example, the short-range communication sub-system may include an infrared device and associated circuits and components, a Wi-Fi or a Bluetooth (trademark) communication module to provide for communication with similarly enabled systems and devices. Sub-system 806 may have one or more inputs or outputs to sub-system 804 in processing signals for its networks.

In addition to processing communication signals, DSP 830 provides control of receiver 826 and transmitter 824. For example, gains applied to communication signals in receiver 826 and transmitter 824 may be adaptively controlled through automatic gain-control algorithms implemented in DSP 830.

For an 802.11 sub-system 804, a particular operational aspect of its receiver 822 and antenna 826 is that they need to be tuned to receive signals in the IEEE 802.11 network bands, e.g. signals in the 2.4 GHz to 6 GHz range for sub-systems 806 and if needed, sub-system 804. A filter may be provided in receiver 822 and/or around antenna 826 (not shown) to block out signals that are outside an expected frequency range of signals for sub-system 804. Such a filter may operate as a band pass filter to reduce intermodulation distortion. Additional filters on antenna may also be used to provide such functionality.

Receiver 822 and antenna 826 provide at least some of the hardware and software elements needed to detect when device 116a is in the presence of communication signals from networks 118 and 112.

It will be appreciated that in other embodiment, different architectures can be implemented to provide the functionalities of CNEM 820F, NMM 820G, sub-systems 804a . . . n and sub-system 806a . . . n. For example, network analysis and/or network transmission updates may be processed through one or more central modules. Additionally or alternatively, some functions may be provided by modules/devices remote to device 116a. For example, information regarding network conditions may be sent to device 116a from an external source (such as an AP, a server or another device 116).

Powering electronics of device 116a is power source 834. In one embodiment, the power source 434 includes one or more batteries. In another embodiment, power source 834 is a single battery pack, especially a rechargeable battery pack. A power switch (not shown) provides an "on/off" switch for device 116a. A power source interface (not shown) may be provided in hardware, firmware, software or a combination of such elements to selectively control access of components in device 116a to power source 834. Upon activation of the power switch an application 820 is initiated to turn on device 116a. Upon deactivation of the power switch, an application 820 is initiated to turn off device 116. Power to device 116a may also be controlled by other devices and by software applications 820.

Device 116a may also have global positioning system (GPS) 836 to assist in identifying a present location of device 116a and may also have light sensor 838 to provide data on the ambient light conditions for device 116a.

Although an embodiment has been described in terms of identifying/maintaining server/client device hierarchies in a wireless network, such as an IEEE 802.11 network, the features of an embodiment may be provided in coordinate aspects of different connections among different devices in different networks.

It will be appreciated that CNEM 820F, NMM 820G and other modules in the embodiments may be implemented using known programming techniques, languages, processes and algorithms. Although the modules, processes and applications described are implemented in device 116a, it will be appreciated that some functions of the modules may be provided in a separate server that is in communication with device 116a. The titles of the modules are provided as a convenience to provide labels and assign functions to certain modules. It is not required that each module perform only its functions as described above. As such, specific functionalities for each application may be moved between applications or separated into different applications. Modules may be contained within other modules. Different signalling techniques may be used to communicate information between applications using known programming techniques. Known data storage, access and update algorithms allow data to be shared between applications. It will further be appreciated that other applications and systems on device 116a may be executing concurrently with other modules. As such, any of modules 820 (or parts thereof) may be structured to operate in as a "background" application on device 116a, using programming techniques known in the art.

Some of the values in Tables A-H have been determined through experimentation. Other values have been determined by regulation or convention. In other embodiments, variations may be provided for any of the values. Data shown in the Tables, charts, thresholds, Equations and other factors described herein may be stored in one or more of the devices and accessed by the related modules. In other embodiments additional operational data may be collected or determined to identify other maximum or preferred transmission power levels for WLAN transmissions depending on the current state of connections to WLAN and cellular networks. Preferably, the data would be translated into various states of operation of device 116a and preferred/maximum transmission levels for device 116a for various networks. Preferably, the data in the tables provide power levels that are independent of WLAN chipsets that are available to device 116a. Also, the data and an interface for implementing power changes (or other adjustments) can be modified to accommodate for transmission requirements and guidelines for technological, regulatory and administrative changes to WLAN, cellular (including LTE) and other communication technologies.

In one configuration for the networks described herein, a transceiver and devices in the network have a "server/client" relationship, where the transceiver is a "server" device for the network and the devices are the "clients". The terms "server/clients" refer generally to devices that are related in some hierarchical manner (e.g. with a designated parent) or non-hierarchical network (e.g. in a peer-to-peer network). Other terms may be used to describe comparable device relationships for an embodiment, such as "master/slave", "network node/client", "access point/clients", "AP/nodes", etc.

It will be appreciated that the embodiments relating to client devices, server devices and systems may be implemented in a combination of electronic modules, hardware, firmware and software. The firmware and software may be implemented as a series of processes, applications and/or modules that provide the functionalities described herein. The modules, applications, algorithms and processes described herein may be executed in different order(s). Interrupt routines may be used. Data, applications, processes, programs, software and instructions may be stored in volatile and non-volatile devices described and may be provided on other tangible medium, like USB drives, computer discs, CDs, DVDs or other substrates herein and may be updated by the modules, applications, hardware, firmware and/or software. The data, applications, processes, programs, software and instructions may be sent from one device to another via a data transmission.

As used herein, the wording "and/or" is intended to represent an inclusive-or. That is, "X and/or Y" is intended to mean X or Y or both.

In this disclosure, all adjustment values, decrease values, cut-off values, thresholds and measured value are provided as an approximate value (for example, when the adjustment values is qualified with the word "about"), a range of values will be understood to be valid for that value. For example, for an adjustment value stated as an approximate value, a range of about 25% larger and 25% smaller than the stated value may be used. Thresholds, values, measurements and dimensions of features are illustrative of embodiments and are not limiting unless noted. Further, as an example, a "sufficient" match with a given condition or threshold may be a value that is within the provided threshold, having regard to the approximate value applicable to the threshold and the understood range of values (over and under) that may be applied for that threshold.

The present disclosure is defined by the claims appended hereto, with the foregoing description being merely illustrative of embodiments of the disclosure. Those of ordinary skill may envisage certain modifications to the foregoing embodiments which, although not explicitly discussed herein, do not depart from the scope of the disclosure, as defined by the appended claims.

The invention claimed is:

1. A method comprising:
in response to determining, at a communication device, that the communication device is linked to a first communication network and a second communication network:
measuring, at the communication device, a received signal strength indicator (RSSI) value of signals received from the second communication network;
determining, at the communication device, a data rate of the signals received from the second communication network;
selecting, at the communication device, a minimum required signal strength indicator value based on the determined data rate;
comparing, at the communication device, the RSSI value of the signals received from the second network against a threshold, wherein the threshold is determined based on the selected minimum required signal strength indicator value, a de-sense value due to an expected interference level from the first communication network, and an adjustment value related to operating conditions of the communication device; and,
when the RSSI value of the signals received from the second communication network is less than or equal to the threshold, adjusting, at the communication device, communication parameters that the communication device uses to communicate with one or more of the first communication network and the second communication network to mitigate co-interference between communications between the communication device and the first communication network and the signals received from second communication network;
repeating, at the communication device, measuring, determining, selecting, comparing, and adjusting until determining, at a communication device, that the communication device is no longer linked to the first communication network and the second communication network.

2. The method as claimed in claim 1, further comprising:
when the RSSI value of the signals received from the second communication network is greater than the threshold, not adjusting, at the communication device, the network parameters of the communication device and not adjusting, at the communication device, transmission parameters of signals transmitted to the first communication network.

3. The method as claimed in claim 1, wherein:
the first communication network is a cellular network; and
the second communication network is a WLAN communication network.

4. The method as claimed in claim 1, wherein:
the first communication network is a cellular network; and
the second communication network utilizes an industrial, scientific and medical (ISM) communication band.

5. The method as claimed in claim 1, wherein:
adjusting, at the communication device, the communication parameters comprises adjusting times when the signals received from the second communication network are monitored, utilizing a first time slot for processing the communications between the first communication network and the communication device and utilizing a second time slot for monitoring for the signals received from the second communication network, the second time slot not overlapping with the first time slot.

6. The method as claimed in claim 5, wherein:
during the first time slot, the communication device does not monitor for the signals received from the second communication network.

7. The method as claimed in claim 1, wherein:
the minimum required RSSI value for the signals received from the second communication network incorporates sensitivity data for a class of communication devices.

8. The method as claimed in claim 1, wherein:
the de-sense value indicates a signal sensitivity level for the signals received from the second communication network due to interference of the first communication network.

9. The method as claimed in claim 1, further comprising:
when the RSSI value of the signals received from the second communication network is greater than the threshold, lowering a transmission power of signals sent by the communication device to the second communication network.

10. The method as claimed in claim 9, wherein:
the transmission power of signals sent by the communication device to the second communication network is lowered by a factor accounting to specific absorption rate (SAR) limits.

11. The method as claimed in claim 1, wherein adjusting, at the communication device, the communication parameters that the communication device uses to communicate with one or more of the first communication network and the second communication network comprises one or more of:
changing a level of transmission power of signals sent by the communication device to the first communication network;
changing a transmission band used to receive the signals from the second communication network;
changing a channel parameter of signals sent by the communication device to the second communication network;
changing a frequency of signals sent by the communication device to the second communication network; and,
changing a level of transmission power of signals sent by the communication device to the second communication network.

12. A communication device comprising:
a communication subsystem comprising a receiver, a transmitter and one or more antennas configured to link with a first network and a second network; and
a processor operably coupled to the communication subsystem and configured to:
monitor for when the communication subsystem is linked to the first network and the second network;
in response to determining that the communication subsystem is linked to the first communication network and the second communication network:
measure a received signal strength indicator value (RSSI) and determine a data rate of signals received from the second network;
select a minimum required signal strength indicator value based on the determined data rate;
compare the RSSI value of the signals received from the second communication network against a threshold, wherein the threshold is determined based on the selected minimum required signal strength indicator value, a de-sense value due to an expected interference level from the first network, and an adjustment value related to operating conditions of the communication device; and
when the RSSI value of the signals received from the second communication network is less than or equal to the threshold, initiate an adjustment of communication parameters that the communication device uses to communicate with one or more of the first communication network and the second communication network to mitigate co-interference between communications between the communication device and the first communication network and the signals received from second communication network;
repeat measure, determine, select, compare, and adjust until the processor determines that the communication device is no longer linked to the first network and the second network.

13. The communication device as claimed in claim 12, wherein the processor is further configured to:
when the RSSI value of the signals is greater than the threshold:
not adjust the network parameters of the communication device; and
not adjust transmission parameters of signals transmitted to the first communication network.

14. The communication device as claimed in claim 12, wherein:
the processor is further configured to adjust the network parameters by adjusting times when the signals received from the second communication network are monitored, utilizing a first time slot for processing communications for the first communication network and a second time slot for monitoring for the signals received from the second communication network, the second time slot not overlapping with the first time slot.

15. The communication device as claimed in claim 14, wherein:
during the first time slot, the processor is configured to not monitor for the signals received from the second communication network.

16. The communication device as claimed in claim 12, wherein:
the first communication network is a cellular network; and
the second communication network is a WLAN communication network.

17. The communication device as claimed in claim 12, wherein the processor is further configured to adjust the communication parameters that the communication device uses to communicate with one or more of the first communication network and the second communication network by one or more of:
- changing a level of transmission power of signals sent by the communication device to the first communication network;
- changing a transmission band used to receive the signals from the second communication network;
- changing a channel parameter of signals sent by the communication device to the second communication network;
- changing a frequency of signals sent by the communication device to the second communication network; and,
- changing a level of transmission power of signals sent by the communication device to the second communication network.

18. The communication device as claimed in claim 12, wherein the processor is further configured to:
- RSSI value of the signals received from the second communication network is greater than the threshold, lowering a transmission power of signals sent to the second network.

19. The communication device as claimed in claim 12, wherein the transmission power of signals sent to the second communication network is lowered by a factor accounting to specific absorption rate (SAR) limits.

20. A non-transitory computer-readable medium storing computer-readable instructions executable by a processor of a communication device to:

in response to determining, at a communication device, that the communication device is linked to a first communication network and a second communication network:
- measure a received signal strength indicator (RSSI) value and determine a data rate of signals received from the second network;
- select a minimum required signal strength indicator value based on the determined data rate;
- compare, at the communication device, the RSSI value of the signals received from the second communication network against a threshold, wherein the threshold is determined based on the selected minimum required signal strength indicator value, a de-sense value due to an expected interference level from the first network, and an adjustment value related to operating conditions of the communication device; and,
- when the RSSI value of the signals received from the second communication network is less than the threshold, adjusting, at the communication device, communication parameters that the communication device uses to communicate with one or more of the first communication network and the second communication network to mitigate co-interference between communications between the communication device and the first communication network and the signals received from second communication network;
- repeat measure, determine, select, compare and adjust until determining, at a communication device, that the communication device is no longer linked to the first communication network and the second communication network.

* * * * *